(12) United States Patent
Zhang et al.

(10) Patent No.: US 12,224,601 B2
(45) Date of Patent: Feb. 11, 2025

(54) BATTERY PACK

(71) Applicant: Positec Power Tools (Suzhou) Co., Ltd, Suzhou (CN)

(72) Inventors: Qing Zhang, Suzhou (CN); Qiang Deng, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 648 days.

(21) Appl. No.: 17/548,327

(22) Filed: Dec. 10, 2021

(65) Prior Publication Data

US 2022/0102988 A1 Mar. 31, 2022

Related U.S. Application Data

(63) Continuation of application No. PCT/CN2020/095877, filed on Jun. 12, 2020.

(30) Foreign Application Priority Data

Jun. 12, 2019 (CN) .......................... 201910506593.1
Jun. 12, 2019 (CN) .......................... 201910506629.6

(Continued)

(51) Int. Cl.
*H02J 7/00* (2006.01)
*H01M 10/42* (2006.01)
(Continued)

(52) U.S. Cl.
CPC ....... *H02J 7/00032* (2020.01); *H01M 10/425* (2013.01); *H01M 10/441* (2013.01);
(Continued)

(58) Field of Classification Search
CPC ......... H02J 7/00032; H02J 7/0049; H02J 7/00
See application file for complete search history.

(56) References Cited

U.S. PATENT DOCUMENTS

| 6,107,780 A | 8/2000 | Kellerman |
| 9,136,724 B2 * | 9/2015 | Ye ...................... H02M 3/1582 |
| 2010/0117602 A1 | 5/2010 | Matsui et al. |

FOREIGN PATENT DOCUMENTS

| CN | 101604849 A | 12/2009 |
| CN | 101719685 A | 6/2010 |

(Continued)

OTHER PUBLICATIONS

Extended European Search Report issued Jul. 18, 2023 in corresponding Application No. 20821816.4, 5 pages.

*Primary Examiner* — Robert Grant
(74) *Attorney, Agent, or Firm* — Lee & Hayes, P.C.

(57) ABSTRACT

The embodiments of the present invention relate to a battery pack, detachably connected to an external device for charging or discharging. The battery pack includes a control module, and a communication terminal. The communication terminal is connected to the control module and the external device, and the control module detects the signal from the communication terminal to decide the pattern to determine the type of the external device. The battery pack further includes a state indication terminal, which is connected to the control module and the external device, and the control module detects at least one operating parameter of the battery, and generates a state parameter related to the operating parameter according to the operating parameter. The control module sends the state parameter to the outside by using the communication terminal, and the control module sends an abnormality signal to the outside by using both of the communication terminal and the state indication terminal. The embodiments of the present invention have the following beneficial effects: the battery pack may be used for an external device without a communication function and may also be used for an external device with the communication function with a plurality of usage scenarios and (Continued)

high universality. Further, the battery pack can not only receive a digital signal but also receive an analog signal by using only one port, to recognize types of external devices on different platforms with communication and without communication, with a small quantity of ports and a high degree of integration. In addition, the battery pack transmits to the outside by using two terminals, to doubly ensure communication, thereby preventing any abnormal communication terminal from causing damage to the use of the battery pack, and improving the use security.

20 Claims, 6 Drawing Sheets

(30) Foreign Application Priority Data

| Jun. 12, 2019 | (CN) | 201910506649.3 |
|---|---|---|
| Jun. 12, 2019 | (CN) | 201910506715.7 |
| Jun. 12, 2019 | (CN) | 201910507358.6 |
| Jun. 12, 2019 | (CN) | 201910507372.6 |

(51) Int. Cl.
*H01M 10/44* (2006.01)
*H01M 10/48* (2006.01)

(52) U.S. Cl.
CPC ......... *H01M 10/482* (2013.01); *H02J 7/0029* (2013.01); *H02J 7/0049* (2020.01); *H02J 7/0068* (2013.01); *H01M 2010/4271* (2013.01)

(56) References Cited

FOREIGN PATENT DOCUMENTS

| CN | 202749913 U | 2/2013 |
|---|---|---|
| CN | 109546627 A | 3/2019 |
| CN | 109861316 A | 6/2019 |
| DE | 102012105483 A1 | 12/2013 |

* cited by examiner

BATTERY PACK

This application is a Continuation Application of International Application No. PCT/CN2020/095877, filed on Jun. 12, 2020, which claims benefit of and priority to Chinese Patent Application No. 201910506649.3, filed on Jun. 12, 2019, Chinese Patent Application No. 201910507372.6, filed on Jun. 12, 2019, Chinese Patent Application No. 201910506629.6, filed on Jun. 12, 2019, Chinese Patent Application No. 201910506715.7, filed on Jun. 12, 2019, Chinese Patent Application No. 201910507358.6, filed on Jun. 12, 2019, Chinese Patent Application No. 201910506593.1, filed on Jun. 12, 2019, all of which are hereby incorporated by reference in their entirety for all purposes as if fully set forth herein.

BACKGROUND

Technical Field

The embodiments of the present invention relate to the field of battery packs, and in particular, to a battery pack.

Related Art

In the field of electric tools, a battery pack with high-energy density is commonly used as a portable power supply for supplying power to an electric tool. The battery pack is formed by a plurality of batteries and has an interface unit for being connected to a tool or a charger. When being connected to the tool, the battery pack discharges the tool, and when the battery pack is connected to charger, the charger charges the batteries in the battery pack, to achieve the reuse. With the development of technologies, a lithium battery pack formed by lithium batteries gradually becomes a mainstream. Due to large energy density of the lithium battery, the lithium battery pack has the advantages such as a large capacity and a small size and provides energy to a handheld electric tool, even an electric vehicle, and the like.

In the prior art, lithium battery protection is performed on the battery pack. One manner is that one communication channel is formed by a communication unit and one signal terminal. Whether a lithium battery fault such as over-charge, over-discharge, or over-temperature occurs is determined according to acquired information such as a temperature and a voltage of the battery in the battery pack, when the fault occurs, an abnormality signal is generated, and the communication unit of the battery pack transmits the abnormality signal to the outside by using the signal terminal in a serial manner, and an external tool or a charger stops charging or discharging when receiving the signal. However, if a fault occurs in the communication channel for transmitting data, the tool and the charger cannot obtain accurate information about the battery pack. In this case, the battery pack may be damaged with low use security.

SUMMARY

To overcome defects of the prior art and resolve a problem of low universality of an external device of a battery pack, the embodiments described here of the present invention provide a method for recognizing a working status of a battery pack. The battery pack is connected to the external device for charging or discharging, the external device includes a consumer and a charger, the working status of the battery pack includes a charging state and a discharging state, the battery pack includes a communication terminal, and the battery pack establishes communication with the external device when being connected to the external device, where the method includes the following steps:

detecting whether the communication terminal of the battery pack receives a digital signal of the external device;

determining a type of the external device according to the digital signal if the communication terminal of the battery pack receives the digital signal of the external device; and detecting an analog signal at the communication terminal of the battery pack if the communication terminal of the battery pack does not receive the digital signal of the external device, and determining the type of the external device according to the analog signal.

When it is determined that the external device is the charger, the battery pack is in a charging state; and when it is determined that the external device is the consumer, the battery pack is in a discharging state.

Further, the determining a type of the external device according to the digital signal includes: determining that the external device is the charger when the digital signal is a first handshake signal; and determining that the external device is the consumer when the digital signal is a second handshake signal.

Further, the determining the type of the external device according to the analog signal includes: determining the type of the external device according to a voltage state of the analog signal, where when the voltage state is greater than or equal to a preset voltage value, the external device is the charger, and when the voltage state is less than the preset voltage value, the external device is the consumer.

Further, after the determining that the type of the external device is the charger according to the digital signal, the method further includes: receiving a parameter reading instruction sent by the charger; and sending a working parameter and/or a state parameter of the battery pack according to the parameter reading instruction.

Further, after the determining that the type of the external device is the charger according to the digital signal, the method further includes: receiving a charging state notification instruction sent by the charger, and entering a low power consumption mode, where the charging state notification instruction includes fault information of the charger or full charge information of the battery pack.

Further, the working parameter includes any one of a maximum allowable charging voltage, a maximum allowable charging current, a maximum allowable charging temperature, or a minimum allowable charging temperature; and the state parameter includes any one of a full-pack voltage, a single voltage of a battery core, a battery pack temperature, or a fault state.

Further, after the determining that the type of the external device is the consumer according to the digital signal, the method further includes: receiving a parameter reading instruction of the consumer; and sending the working parameter and/or the state parameter of the battery pack according to the parameter reading instruction.

Further, the working parameter includes any one of a maximum allowable discharging voltage, a maximum allowable discharging current, a maximum allowable discharging temperature, or a minimum allowable discharging temperature; and the state parameter includes any one of a full-pack voltage, a single voltage of a battery core, a battery pack temperature, or a fault state.

Further, when the external device is the charger, the battery pack performs only over-charge determining in over-charge determining and over-discharge determining, if over-charge occurs, an abnormality signal is outputted, and the charger receives the abnormality signal and stops charging; and when the external device is the consumer, the battery pack performs only over-discharge determining in the overcharge determining and over-discharge determining, if over-discharge occurs, the abnormality signal is outputted, and the consumer receives the abnormality signal and stops discharging.

Any of the embodiments described here of the present invention further provides a battery pack using the method for recognizing a working status, the battery pack including: a control module and a communication terminal, where the control module is connected to the communication terminal, the communication terminal is configured to be connected to an external device, and a type of the external device includes a consumer and a charger; when the battery pack is connected to the external device, the control module is configured to detect whether a digital signal of the external device is received from the communication terminal within a preset time; the control module determines the type of the external device according to the digital signal if the digital signal of the external device is received from the communication terminal; the control module detects an analog signal at the communication terminal if the digital signal of the external device is not received from the communication terminal, and determines the type of the external device according to the analog signal; when it is determined that the external device is the charger, the battery pack is in a charging state; and when it is determined that the external device is the consumer, the battery pack is in a discharging state.

Further, the control module includes a communication unit and a working status recognition interface, and the communication unit includes a sending interface and a receiving interface; and the sending interface, the receiving interface, and the working status recognition interface are respectively connected to the communication terminal, the control module detects, by using the receiving interface, whether the digital signal of the external device is received from the communication terminal, and the control module detects the analog signal at the communication terminal by using the working status recognition interface.

Further, the communication unit is a serial communication unit, the communication terminal is a half-duplex serial interface, and the communication unit performs serial communication with the external device through the communication terminal, to receive the digital signal.

Further, the digital signal includes a first handshake signal and a second handshake signal; when the digital signal received by the control module is the first handshake signal, it is determined that the type of the external device is the charger; and when the digital signal received by the control module is the second handshake signal, it is determined that the type of the external device is the consumer.

Further, the digital signal includes a parameter reading instruction, and when receiving the parameter reading instruction from the communication terminal, the control module sends a working parameter and/or a state parameter of the battery pack to the external device by using the communication terminal.

Further, when the external device is the charger, the working parameter includes any one of a maximum allowable charging voltage, a maximum allowable charging current, a maximum allowable charging temperature, or a minimum allowable charging temperature; and the state parameter includes any one of a full-pack voltage, a single voltage of a battery core, a battery pack temperature, or a fault state.

Further, when the external device is the consumer, the working parameter includes any one of a maximum allowable discharging voltage, a maximum allowable discharging current, a maximum allowable discharging temperature, or a minimum allowable discharging temperature; and the state parameter includes any one of a full-pack voltage, a single voltage of a battery core, a battery pack temperature, or a fault state.

Further, the digital signal includes a charging state notification instruction, the battery pack has a low power consumption mode and a normal power consumption mode, the low power consumption mode has a first power consumption, the normal power consumption mode has a second power consumption, and the first power consumption is less than the second power consumption; and when the control module receives the charging state notification instruction from the communication terminal, the control module controls the battery pack to be switched from the normal power consumption mode to the low power consumption mode.

Further, the charging state notification instruction includes fault information of the charger or full charge information of the battery pack and is sent by the charger.

Further, the control module internally stores a preset value, when the control module determines that a voltage state of the analog signal is greater than or equal to the preset value, the external device is the charger, and when determining that the voltage state of the analog signal is less than the preset value, the control module determines that the external device is the consumer.

Further, the battery pack further includes a battery set and a state indication terminal, the state indication terminal is connected to the control module and is connected to the external device, and the battery set includes a plurality of battery cores connected in series;

the control module is connected to each battery core and is configured to acquire a single voltage of the battery core, a first voltage and a second voltage are preset in the control module, and the first voltage is greater than the second voltage;

when the external device is the charger, the control module compares the single voltage with the first voltage but not with the second voltage, if a single voltage of any one of the battery cores is greater than the first voltage, it is determined that the battery pack is in an over-charge state, the control module controls the state indication terminal to output an abnormality signal, and the charger receives the abnormality signal and stops charging; and when the external device is the consumer, the control module compares the single voltage with the second voltage but not with the first voltage, if the single voltage is less than the second voltage, it is determined that the battery pack is in an over-discharge state, the control module controls the state indication terminal to output the abnormality signal, and the consumer receives the abnormality signal and stops discharging.

Compared with the prior art, the method for recognizing a working status of a battery pack and the battery pack provided in any of the above embodiments described here have the following beneficial effects: the battery pack may be used for an external device without a communication function and may also be used for an external device with the communication function with a plurality of usage scenarios and high universality. In addition, the battery pack can not only receive a digital signal but also receive an analog signal by using only one port, to recognize types of external devices on different platforms with communication and without communication, with a small quantity of ports and a high degree of integration.

For problems that a conventional battery pack is overdischarged, cannot be charged when being connected to a charger, is over-charged, and cannot discharge when being connected to a tool, the embodiments described here of the present invention provide a battery pack, detachably connected to an external device for charging or discharging. The external device includes a consumer and a charger, and the battery pack includes: a battery set, a control module, a first terminal, and a second terminal; the battery set includes a plurality of battery cores connected in series; the first terminal and the second terminal are connected to the control module and are connected to the external device; the control module is connected to each battery core and is configured to acquire a single voltage of the battery core, a first voltage and a second voltage are preset in the control module, and the first voltage is greater than the second voltage; the control module detects a type of the external device by using the first terminal, when the external device is the charger, the control module compares the single voltage with the first voltage but not with the second voltage, and if a single voltage of any one of the battery cores is greater than the first voltage, it is determined that the battery pack is in an over-charge state, and the control module controls the second terminal to output an abnormality signal; and when the external device is the consumer, the control module compares the single voltage with the second voltage not with the first voltage, and if the single voltage is less than the second voltage, it is determined that the battery pack is in an over-discharge state, and the control module controls the second terminal to output the abnormality signal.

Further, the battery pack further includes a switch module, the switch module includes a control end, a first end, and a second end, the control end of the switch module is connected to the control module, the first end of the switch module is connected to the second terminal, and the second end of the switch module is grounded; and the control module controls, by using the control end, the switch module to be opened or closed, when the switch module is opened, the second terminal is disconnected from the ground, and when the external device detects that the second terminal is suspended, so that the second terminal outputs the abnormality signal.

Further, the battery pack further includes a temperature detection module, configured to detect a temperature of the battery pack, one end of the temperature detection module is connected to the second terminal, and the other end is connected to the first end of the switch module; and when the switch module is closed, the second terminal is grounded by using the temperature detection module, and the external device detects the temperature detection module by using the second terminal, to obtain the temperature of the battery pack, so that the second terminal outputs the temperature of the battery pack.

Further, the control module includes a communication unit, connected to the first terminal, when the control module determines that the battery pack is in an over-charge state or an over-discharge state, the communication unit outputs an abnormality signal by using the first terminal, and the external device receives the abnormality signal and stops charging or discharging.

Further, when the battery pack is connected to the external device, the control module is configured to detect whether a digital signal of the external device is received from the first terminal within a preset time; the control module determines the type of the external device according to the digital signal if the digital signal of the external device is received from the first terminal; the control module detects an analog signal at the first terminal if the digital signal of the external device is not received from the first terminal, and determines the type of the external device according to the analog signal; when it is determined that the external device is the charger, the battery pack is in a charging state; and when it is determined that the external device is the consumer, the battery pack is in a discharging state.

Further, the control module includes a communication unit and a working status recognition interface, and the communication unit includes a sending interface and a receiving interface; and the sending interface, the receiving interface, and the working status recognition interface are respectively connected to the first terminal, the control module detects, by using the receiving interface, whether the digital signal of the external device is received from the first terminal, and the control module detects the analog signal at the first terminal by using the working status recognition interface.

Further, the communication unit is a serial communication unit, the first terminal is a half-duplex serial interface, and the communication unit performs serial communication with the external device through the first terminal, to receive the digital signal.

Further, the digital signal includes a first handshake signal and a second handshake signal; when the digital signal received by the control module is the first handshake signal, it is determined that the type of the external device is the charger; and when the digital signal received by the control module is the second handshake signal, it is determined that the type of the external device is the consumer.

Further, the digital signal includes a parameter reading instruction, and when receiving the parameter reading instruction from the first terminal, the control module sends a working parameter and/or a state parameter of the battery pack to the external device by using the first terminal.

Further, when the external device is the charger, the working parameter includes any one of a maximum allowable charging voltage, a maximum allowable charging current, a maximum allowable charging temperature, or a minimum allowable charging temperature; and the state parameter includes any one of a full-pack voltage, a single voltage of a battery core, a battery pack temperature, or a fault state.

Further, when the external device is the consumer, the working parameter includes any one of a maximum allowable discharging voltage, a maximum allowable discharging current, a maximum allowable discharging temperature, or a minimum allowable discharging temperature; and the state parameter includes any one of a full-pack voltage, a single voltage of a battery core, a battery pack temperature, or a fault state.

Further, the control module internally stores a preset value, when the control module determines that a voltage state of the analog signal is greater than or equal to the preset value, the external device is the charger, and when determining that the voltage state of the analog signal is less than the preset value, the control module determines that the external device is the consumer.

According to the battery pack provided in any of the above embodiments described here of the present invention, a control module may determine a voltage state of the battery pack, and may recognize a type of an external device by using a first terminal, when the control module recognizes that the external device is a charger, over-discharge fault detection is shielded, when the control module recognizes that the external device is a consumer, over-charge fault detection is shielded, and after performing comprehensive determining, the control module outputs a normality/abnormality signal from a second terminal, to improve a degree of intelligence of the battery pack, thereby making use of the battery pack more convenient.

To overcome defects of the prior art, any of the embodiments described here of the present invention provides a battery pack that has a simple structure and implements unbalanced protection. The battery pack is connected to an external device for charging or discharging, and the battery pack includes a battery set, a state indication terminal, and a control module; the battery set includes a plurality of battery cores connected in series; the state indication terminal is connected to the control module and is connected to the external device; and the control module is connected to each battery core and is configured to acquire a single voltage of each battery core and determine whether the battery set is in an unbalanced state according to the single voltage, and when the battery set is in the unbalanced state, the control module controls the state indication terminal to output an abnormality signal, and the external device receives the abnormality signal and stops charging or discharging.

Further, the determining whether the battery set is in an unbalanced state according to the single voltage includes: comparing, by the control module, a plurality of single voltages, to determine a minimum voltage value and a maximum voltage value, and when a voltage difference between the maximum voltage value and the minimum voltage value is greater than or equal to a first preset difference, determining the battery set is in the unbalanced state.

Further, when determining that any single voltage is greater than or equal to a first voltage, the control module determines that the battery set is in an over-charge state, and the control module controls the state indication terminal to output the abnormality signal; when determining that any single voltage is less than or equal to a second voltage, the control module determines that the battery set is in an over-discharge state, and the control module controls the state indication terminal to output the abnormality signal; and the first voltage is greater than the second voltage.

Further, the battery pack further includes a switch module, the switch module includes a control end, a first end, and a second end, the control end of the switch module is connected to the control module, the first end of the switch module is connected to the state indication terminal, and the second end of the switch module is grounded; and the control module controls, by using the control end, the switch module to be opened or closed, when the switch module is opened, the state indication terminal is disconnected from the ground, and the external device detects that the state indication terminal is suspended, so that the state indication terminal outputs the abnormality signal.

Further, the battery pack further includes a temperature detection module, configured to detect a temperature of the battery pack, a first end of the temperature detection module is connected to the first end of the switch module, and a second end is connected to the state indication terminal; and when the switch module is closed, the state indication terminal is grounded by using the temperature detection module, and the external device detects the temperature detection module by using the state indication terminal to obtain the temperature of the battery pack, so that the state indication terminal outputs the temperature of the battery pack.

Further, the first end of the temperature detection module is further connected to the control module, and the temperature detection module is configured to send acquired temperature information of the battery pack to the control module.

Further, the battery pack has a low power consumption mode and a normal power consumption mode, the low power consumption mode has a first power consumption, the normal power consumption mode has a second power consumption, and the first power consumption is less than the second power consumption; the battery pack further includes a switch activation circuit and a peripheral working circuit, and the switch activation circuit is connected to the state indication terminal; the control module includes a power supply switch, and the power supply switch is connected to the battery set, so that the battery set supplies power to the control module and the peripheral working circuit by using the power supply switch; and when the switch activation circuit obtains an activation signal of the external device by using the state indication terminal, and the switch activation circuit controls the power supply switch to be turned on, so that the battery pack is switched from the low power consumption mode to the normal power consumption mode.

Further, the switch activation circuit includes a first charging unit and an activation switch; the activation switch includes a control end, a first end, and a second end, the control end of the activation switch is connected to one end of the first charging unit, and the other end of the first charging unit is connected to the state indication terminal; the first end of the activation switch is connected to a power supply of the battery set, and the second end of the activation switch is connected to the power supply switch; and the first charging unit obtains the activation signal of the external device by using the state indication terminal and is charged, to control the activation switch to be turned on, and the second end of the activation switch outputs a control signal to control the power supply switch to be turned on.

Further, the state indication terminal has a voltage state, and the activation signal indicates that the voltage state of the state indication terminal rises from the first voltage to the second voltage.

Further, the battery pack has the low power consumption mode and the normal power consumption mode, the low power consumption mode has the first power consumption, the normal power consumption mode has the second power consumption, and the first power consumption is less than the second power consumption; the control module is connected to the state indication terminal, the control module internally stores a connection recognition preset voltage, the control module detects a voltage state at the state indication terminal and compares the voltage state with the connection recognition preset voltage, and when the voltage state is greater than or equal to the connection recognition preset voltage, the battery pack is connected to the external device; and when the voltage state is less than the connection recognition preset voltage, the battery pack is disconnected from the external device, and the battery pack is switched from the normal power consumption mode to the low power consumption mode.

According to the battery pack provided in any of the embodiments described here, it may be determined whether the battery pack is in an unbalanced state according to an acquired single voltage, if the battery pack is in the unbalanced state, the battery pack sends an abnormality signal to an external device, and the external device controls stopping of a charging and discharging process, so that no control inside the battery pack may be required, and the battery pack has a simple structure and low costs.

To overcome defects of the prior art, any of the embodiments described here of the present invention provide a battery pack that has a low power consumption mode and that actively enters the low power consumption mode when being fully charged. The battery pack is connected to an external device for charging or discharging, the external device includes a consumer and a charger, and the battery pack includes a battery set and a circuit module connected to the battery set; the circuit module obtains power supplied by the battery set, the circuit module has a low power consumption mode and a normal power consumption mode, the low power consumption mode has a first power consumption, the normal power consumption mode has a second power consumption, and the first power consumption is less than the second power consumption; and when the circuit module learns that the battery set has been fully charged, the circuit module is switched from the normal power consumption mode to the low power consumption mode.

Further, the battery pack further includes a first terminal, the first terminal is connected to the circuit module, and the battery pack is connected to the external device by the first terminal; and when the battery pack is connected to the charger, and the charger determines that the battery set has been fully charged, the charger transmits a charging state notification instruction to the first terminal, where the charging state notification instruction includes full charge information of the battery pack, and the circuit module learns that the battery set has been fully charged when receiving the charging state notification instruction.

Further, the battery set includes battery cores connected in series, and the circuit module is connected to each battery core and is configured to acquire a single voltage of the battery core and determine, according to the single voltage, whether the battery set is fully charged; and if the circuit module determines that the battery set has been fully charged, the circuit module learns that the battery set has been fully charged.

Further, the circuit module detects at least one working parameter of the battery set and determines whether the battery set is in a fault state according to the working parameter; and if the battery set is in the fault state, the circuit module is switched from the normal power consumption mode to the low power consumption mode.

Further, the battery pack further includes a first terminal, the first terminal is connected to the circuit module, and the battery pack is connected to the external device by the first terminal; and when the battery pack is connected to the charger, and the charger determines that a fault occurs in the charger, the charger transmits a charging state notification instruction of the charger to the first terminal, where the charging state notification instruction includes fault information of the charger, and the circuit module receives the charging state notification instruction and is switched from the normal power consumption mode to the low power consumption mode.

Further, the battery pack further includes a second terminal, connected to the circuit module, and when the battery pack is connected to the external device, the second terminal is connected to the external device;

the circuit module internally stores a connection recognition preset voltage, the circuit module detects a voltage state at the second terminal and compares the voltage state with the connection recognition preset voltage, and when the voltage state is greater than or equal to the connection recognition preset voltage, the battery pack is connected to the external device; and when the voltage state is less than the connection recognition preset voltage, the battery pack is disconnected from the external device, and the circuit module is switched from the normal power consumption mode to the low power consumption mode.

Further, the battery pack further includes a first terminal, the first terminal is connected to the circuit module, and the battery pack is connected to the external device by the first terminal; and the circuit module includes a timer with a preset first time, when the circuit module determines that the external device is the charger by using the first terminal, the timer is started, and when the timer reaches the preset first time, the circuit module is switched from the normal power consumption mode to the low power consumption mode.

Further, the circuit module includes a power supply switch, the power supply switch is connected to the battery set, the circuit module controls the power supply switch to be turned on/off, and whether the circuit module obtains power supplied by the battery set is controlled through on or off of the power supply switch;

when the circuit module controls the power supply switch to be opened, power supplied to the circuit module is stopped, and the circuit module is switched from the normal power consumption mode to the low power consumption mode; and when the circuit module controls the power supply switch to be turned on, the circuit module obtains power, and the circuit module is switched from the low power consumption mode to the normal power consumption mode.

Further, the circuit module includes a control module and a peripheral working circuit connected to the control module;

the control module includes the power supply switch, a voltage stabilizing unit, and an internal working circuit, the battery set is connected to one end of the power supply switch, the other end of the power supply switch is connected to the voltage stabilizing unit, and the voltage stabilizing unit receives power supplied by the battery set and outputs working power to the internal working circuit and the peripheral working circuit for supplying power to the internal working circuit and the peripheral working circuit; and when the power supply switch is opened, the output of the voltage stabilizing unit is cut off, the internal working circuit and the peripheral working circuit are powered off, and the circuit module is switched from the normal power consumption mode to the low power consumption mode.

Further, the control module is a micro-controller.

Further, the internal working circuit sends a control signal to the power supply switch during working, to control the power supply switch to be turned on/off.

Further, the circuit module further includes a switch activation circuit, the battery pack further includes at least one terminal, the at least one terminal is connected to the circuit module, and the battery pack is connected to the external device by the at least one terminal;

one end of the switch activation circuit is connected to the at least one terminal, and the other end is connected to the power supply switch; and when the battery pack is connected to the external device, the at least one terminal receives an activation signal from the external device and transmits the activation signal to the switch activation circuit, the switch activation circuit controls the power supply switch to be turned on, and the circuit module is switched from the low power consumption mode to the normal power consumption mode.

Further, the at least one terminal includes a first terminal, the first terminal is connected to the circuit module, and the battery pack is connected to the external device by the first terminal; and the battery pack further includes a type recognition element, connected to the first terminal, and when the battery pack is connected to the external device, the external device may detect the type recognition element by using the first terminal, to obtain type information of the battery pack.

Further, the at least one terminal includes a first terminal, the first terminal is connected to the circuit module, and the battery pack is connected to the external device by the first terminal; and the control module includes a communication unit, the communication unit is connected to the first terminal, and the communication unit communicates with the external device by using the first terminal.

Further, the control module includes the communication unit, the communication unit is connected to the first terminal, and the communication unit communicates with the external device by using the first terminal.

Further, the at least one terminal further includes a second terminal, the second terminal is connected to the circuit module, and the battery pack is connected to the external device by the second terminal;

the circuit module detects at least one working parameter of the battery set and determines whether the battery set is in a fault state according to the working parameter; and when determining that the battery pack is in the fault state, the circuit module controls the second terminal to output an abnormality signal.

Further, the at least one terminal further includes the second terminal, the second terminal is connected to the circuit module, and the battery pack is connected to the external device by the second terminal;

the circuit module internally stores a connection recognition preset voltage, the circuit module detects a voltage state at the second terminal and compares the voltage state with the connection recognition preset voltage, and when the voltage state is greater than or equal to the connection recognition preset voltage, the battery pack is connected to the external device; and when the voltage state is less than the connection recognition preset voltage, the battery pack is disconnected from the external device, and the circuit module is switched from the normal power consumption mode to the low power consumption mode.

Further, the circuit module detects at least one working parameter of the battery set and determines whether the battery set is in a fault state according to the working parameter; and when determining that the battery pack is in the fault state, the circuit module controls the second terminal to output an abnormality signal.

Further, the switch activation circuit includes a charging unit and an activation switch;

a control end of the activation switch is connected to one end of the charging unit, and the other end of the charging unit is connected to the at least one terminal; and the at least one terminal receives an activation signal from the external device and transmits the activation signal to the switch activation circuit, the charging unit is charged by using the activation signal, and the charging unit controls the activation switch to be turned on, so that the activation switch controls the power supply switch to be turned on.

Further, the activation signal indicates that a voltage state of the at least one terminal rises from a first voltage to a second voltage.

Further, the circuit module further includes a key operated by a user, the switch activation circuit is grounded by using the key, and the switch activation circuit is configured to control on or off of the switch through closing or opening of the key.

Further, the peripheral working circuit further includes a battery level display module, when the user presses the key, the key is closed, the battery level display module is activated to display a battery level of the battery set, the switch activation circuit controls the power supply switch to be turned on, and the circuit module is switched from the low power consumption mode to the normal power consumption mode.

Compared with the prior art, a circuit module of the battery pack provided in any of the embodiments described here of the present invention have a low power consumption mode and a normal power consumption mode, the circuit module is in the normal power consumption mode when the battery pack is charged or performs discharging, and when the battery pack learns that the battery pack has been fully charged, the circuit module is actively switched to the low power consumption mode, and the battery pack enters the low power consumption mode, so that a useless power consumption of the battery pack when the battery pack does not work can be reduced, thereby achieving intelligence of the battery pack and prolonging the life of the battery pack.

Any of the embodiments described here of the present invention provides a battery pack with a more optimal communication configuration. The battery pack is detachably connected to an external device for charging or discharging, the external device includes a consumer and a charger, the battery pack includes a monitoring unit, a communication unit, and a communication terminal, and the monitoring unit is configured to acquire and obtain a state parameter of the battery pack; the communication unit is connected to the external device by the communication terminal and establishes communication with the external device, and the communication unit is connected to the monitoring unit; and only when the communication unit receives a parameter reading instruction sent by the external device from the communication terminal, the communication unit obtains the state parameter from the monitoring unit, and sends the state parameter to the external device by using the communication terminal.

Further, the battery pack includes a type recognition element, connected to the communication terminal, and when the battery pack is connected to the external device, the external device may detect the type recognition element by using the communication terminal, to obtain type information of the battery pack.

Further, the state parameter includes any one of a full-pack voltage, a single voltage of a battery core, a battery pack temperature, or a fault state.

Further, the communication terminal is connected to one end of the type recognition element, the other end of the type recognition element is grounded, the communication unit includes a sending port and a receiving port, and the communication terminal is connected to the sending port and the receiving port.

Further, the battery pack further includes a storage unit, the storage unit stores a charging parameter and/or a discharging parameter of the battery pack, and the communication unit is connected to the storage unit; and only when the communication unit receives the parameter reading instruction sent by the external device from the communication terminal, the communication unit obtains the state parameter from the monitoring unit, and sends the charging parameter or the discharging parameter to the outside by using the communication terminal.

Further, the charging parameter includes a maximum allowable charging current; and the charger sets a constant charging current value according to the maximum allowable charging current, to control a constant current charging process.

Further, the charging parameter includes a maximum allowable charging temperature and a minimum allowable charging temperature; and the charger sets an over-temperature protection value according to the maximum allowable charging temperature and the minimum allowable charging temperature, the charger obtains a temperature of the battery pack and compares the temperature of the battery pack with the charging over-temperature protection value, and when the temperature of the battery pack exceeds the charging over-temperature protection value, an over-temperature fault occurs, and the charger stops a charging process.

Further, the charging parameter includes a maximum allowable charging voltage; and the charger sets a constant charging voltage value according to the maximum allowable charging voltage, to control a constant voltage charging process.

Further, the discharging parameter includes a maximum allowable discharging current; and the consumer sets an over-current protection value according to the maximum allowable discharging current, the consumer detects a discharging current, and when the discharging current is greater than or equal to the over-current protection value, the consumer stops a discharging process.

Further, the discharging parameter includes a maximum allowable discharging temperature and a minimum allowable discharging temperature; and the consumer sets a discharging over-temperature protection value according to the maximum allowable discharging temperature and the minimum allowable discharging temperature, the consumer obtains the temperature of the battery pack and compares the temperature of the battery pack with the discharging over-temperature protection value, and when the temperature of the battery pack exceeds the discharging over-temperature protection value, an over-temperature fault occurs, and the consumer stops the discharging process.

Further, the discharging parameter includes a minimum allowable discharging voltage; and the consumer sets an over-discharge protection value according to the minimum allowable discharging voltage of the battery pack, the consumer obtains a voltage of the battery pack and compares the voltage of the battery pack with the over-discharge protection value, and when the voltage of the battery pack is less than or equal to the over-discharge protection value, an over-discharge fault occurs, and the consumer stops the discharging process.

Further, when the battery pack is connected to the external device, the monitoring unit is configured to detect whether a digital signal sent by the external device is received from the communication terminal within a preset time; if the digital signal is received from the communication terminal, the monitoring unit determines a type of the external device according to the digital signal; if the digital signal is not received from the communication terminal, the monitoring unit detects an analog signal at the communication terminal and determines the type of the external device according to the analog signal; when it is determined that the external device is the charger, the battery pack is in a charging state; and when it is determined that the external device is the consumer, the battery pack is in a discharging state.

Compared with the prior art, the embodiments described here of the present invention have the following beneficial effects: the battery pack, only used as a data acquisition end, does not actively transmit data to the outside by using a communication unit and transmits the data to the outside when an external device has a need. First, a line conflict caused by the battery pack and the external device actively sending data simultaneously is avoided, and then the battery pack, as a communication slave, sends information about the battery pack to the outside only when there is a need, to prevent the battery pack from continuously and actively sending the data to the outside to perform a useless operation and waste energy of the battery pack.

Based on this, to resolve problems of a small adaption range and low universality of the battery pack and the external device, any of the embodiments described here of the present invention provides a battery pack with high adaptability. The battery pack is detachably connected to an external device for charging or discharging, and the external device includes a consumer and a charger; the battery pack further includes a storage unit, a communication unit, and a communication terminal, and the storage unit stores a charging parameter and a discharging parameter of the battery pack; and the communication unit is connected to the external device by the communication terminal and establishes communication with the external device, and the communication unit is connected to the storage unit and sends the charging parameter or the discharging parameter from the communication terminal to the external device, so that the external device controls a charging process or a discharging process according to the charging parameter or the discharging parameter.

Further, the charging parameter includes a maximum allowable charging current; and the charger sets a constant charging current value according to the maximum allowable charging current, to control a constant current charging process.

Further, the charging parameter includes a maximum allowable charging temperature and a minimum allowable charging temperature; and the charger sets a charging over-temperature protection value according to the maximum allowable charging temperature and the minimum allowable charging temperature, the charger obtains a temperature of the battery pack and compares the temperature of the battery pack with the charging over-temperature protection value, and when the temperature of the battery pack exceeds the charging over-temperature protection value, an over-temperature fault occurs, and the charger stops the charging process.

Further, the charging parameter includes a maximum allowable charging voltage; and the charger sets a constant charging voltage value according to the maximum allowable charging voltage, to control a constant voltage charging process.

Further, the discharging parameter includes a maximum allowable discharging current; and the consumer sets an over-current protection value according to the maximum allowable discharging current, the consumer detects a discharging current, and when the discharging current is greater than or equal to the over-current protection value, the consumer stops a discharging process.

Further, the discharging parameter includes a maximum allowable discharging temperature and a minimum allowable discharging temperature; and the consumer sets a discharging over-temperature protection value according to the maximum allowable discharging temperature and the minimum allowable discharging temperature, the consumers obtains the temperature of the battery pack and compares the temperature of the battery pack with the discharging over-temperature protection value, and when the temperature of the battery pack exceeds the discharging over-temperature protection value, an over-temperature fault occurs, and the consumer stops the discharging process.

Further, the discharging parameter includes a minimum allowable discharging voltage; and the consumer sets an over-discharge protection value according to the minimum allowable discharging voltage of the battery pack, the consumer obtains a discharging voltage of the battery pack and compares the discharging voltage of the battery pack with the over-discharge protection value, and when the discharging voltage of the battery pack is less than or equal to the over-discharge protection value, an over-discharge fault occurs, and the consumer stops the discharging process.

Any of the embodiments described here of the present invention further provides a charging system with high adaptability, including: a charger and a battery pack, where the battery pack is detachably mounted on the charger for charging; the battery pack includes a storage unit, a communication unit, and a communication terminal; the storage unit stores a charging parameter of the battery pack, the communication unit is connected to the charger by the communication terminal and establishes communication with the charger, and the communication unit is connected to the storage unit and sends the charging parameter to the charger by using the communication terminal; and the charger receives the charging parameter and controls a charging process according to the charging parameter.

Further, the charging parameter includes a maximum allowable charging current, and the charger sets a constant charging current value according to the maximum allowable charging current, to control a constant current charging process.

Further, the charging parameter includes a maximum allowable charging temperature and a minimum allowable charging temperature; and the charger sets an over-temperature protection value according to the maximum allowable charging temperature and the minimum allowable charging temperature, the charger obtains a temperature of the battery pack and compares the temperature of the battery pack with the charging over-temperature protection value, and when the temperature of the battery pack exceeds the charging over-temperature protection value, an over-temperature fault occurs, and the charger stops a charging process.

Further, the charging parameter includes a maximum allowable charging voltage; and the charger sets a constant charging voltage value according to the maximum allowable charging voltage, to control a constant voltage charging process.

Any of the embodiments described here of the present invention further provides a discharging system with high adaptability, including a consumer and a battery pack, where the battery pack is detachably mounted on the consumer for discharging; the battery pack includes a storage unit, a communication unit, and a communication terminal; the storage unit stores a discharging parameter of the battery pack, the communication unit is connected to the consumer by the communication terminal and establishes communication with the consumer, and the communication unit is connected to the memory and sends the discharging parameter to the consumer by using the communication terminal; and the consumer receives the discharging parameter and controls a discharging process according to the discharging parameter.

Further, the discharging parameter includes a maximum allowable discharging current; and the consumer sets an over-current protection value according to the maximum allowable discharging current, the consumer detects a discharging current, and when the discharging current is greater than or equal to the over-current protection value, the consumer stops a discharging process.

Further, the discharging parameter includes a maximum allowable discharging temperature and a minimum allowable discharging temperature; and the consumer sets a discharging over-temperature protection value according to the maximum allowable discharging temperature and the minimum allowable discharging temperature, the consumer obtains the temperature of the battery pack and compares the temperature of the battery pack with the discharging over-temperature protection value, and when the temperature of the battery pack exceeds the discharging over-temperature protection value, an over-temperature fault occurs, and the consumer stops the discharging process.

Further, the discharging parameter includes a minimum allowable discharging voltage; and the consumer sets an over-discharge protection value according to the minimum allowable discharging voltage of the battery pack, the consumer obtains a voltage of the battery pack and compares the voltage of the battery pack with the over-discharge protection value, and when the voltage of the battery pack is less than or equal to the over-discharge protection value, an over-discharge fault occurs, and the consumer stops the discharging process.

Compared with the prior art, the embodiments described here of the present invention have the following beneficial effects: the battery pack is connected to an external device through communication, and may send a preset charging parameter and a preset discharging parameter to the external device by using a communication unit, so that the external device may control a charging process or a discharging process according to the charging parameter or the discharging parameter. Compared with a case that a battery pack in the conventional technology can be adapted to only an external device with a fixed model and the external device can be adapted to only a battery pack with a fixed model, the battery pack, the charging system, and the discharging system in any of the embodiments described here of the present invention have a wide adaption range and high universality.

To improve security of the battery pack and ensure stability of communication, any of the embodiments described here of the present invention further provide a battery pack, detachably connected to an external device for charging or discharging, where the external device includes a consumer and a charger, and the battery pack includes a battery set, a control module, a first signal terminal, and a second signal terminal; the battery set includes a plurality of battery cores connected in series; the first signal terminal and the second signal terminal are connected to the control module and are connected to the external device; and the control module detects at least one operating parameter of the battery set, and generates a state parameter related to the operating parameter according to the operating parameter, the control module sends the state parameter to the outside by using the first signal terminal, and the control module sends the state parameter to the outside by using the second signal terminal.

Further, the state parameter is one of an operating parameter signal of the operating parameter representing an operating status of the battery set or an abnormality signal representing that the battery set is in a fault state.

Further, the control module includes a communication unit, and the control module sends a state parameter of a digital signal to the first signal terminal by using the communication unit and sends a state parameter of an analog signal to the outside by using the second signal terminal.

Further, the state parameter is an abnormality signal representing that the battery set is in a fault state; and when receiving any one of the abnormality signals sent by the first signal terminal and the second signal terminal, the external device stops charging or discharging.

Further, the fault state includes any one of an over-charge state, an over-discharge state, an over-temperature state, an unbalanced state, or an over-current state.

Further, the communication unit is a serial communication unit, the communication unit includes a sending interface and a receiving interface, and the sending interface and the receiving interface are respectively connected to the first signal terminal;

when the communication unit sends a digital signal at a first moment, the digital signal is sent to the first signal terminal from the sending interface; when the communication unit receives a digital signal at a second moment, the digital signal is sent to the receiving interface from the first signal terminal; and the first moment is different from the second moment.

Further, the control module detects the digital signal received by the first signal terminal and determines whether the battery pack is in a digital communication fault state according to the received result, if the battery pack is in the digital communication fault state, the control module controls the second signal terminal to output an abnormality signal of an analog signal, and when receiving the abnormality signal, the external device stops charging or discharging.

Further, the step of determining whether the battery pack is in a digital communication fault state according to the received result includes:

sending, by the control module, a preset request instruction, determining, when the control module receives a digital signal, whether the digital signal is a response instruction corresponding to the preset request instruction, and determining that the battery pack is in the digital communication fault state if the digital signal is not the response instruction corresponding to the preset request instruction.

Further, the step of determining whether the battery pack is in a digital communication fault state according to the received result includes:

determining that the battery pack is in the digital communication fault state when the control module does not receive the digital signal and a preset time is reached.

Further, the control module internally stores a connection recognition preset voltage, and the control module detects a voltage state at the second signal terminal, compares the voltage state with the connection recognition preset voltage, and determines that the battery pack is connected to the external device when the voltage state is greater than or equal to the connection recognition preset voltage; and when the voltage state is less than the connection recognition preset voltage, it is determined whether the battery pack is in an analog communication fault state, the control module controls the first signal terminal to output an abnormality signal of the digital signal, and when receiving the abnormality signal, the external device stops charging or discharging.

Further, the battery pack further includes a switch module, the switch module includes a control end, a first end, and a second end, the control end of the switch module is connected to the control module, the first end of the switch module is connected to the second signal terminal, and the second end of the switch module is grounded; and the control module controls, by using the control end, the switch module to be opened or closed, when the switch module is opened, the second signal terminal is disconnected from the ground, and when the external device detects that the second signal terminal is suspended, so that the second signal terminal outputs an abnormality signal of the analog signal.

Further, the battery pack further includes a temperature detection module, configured to detect a temperature of the battery pack, where one end of the temperature detection module is connected to the second signal terminal, and the other end is connected to the first end of the switch module; and when the switch module is closed, the second signal terminal is grounded by using the temperature detection module, and the external device detects the temperature detection module by using the second signal terminal, to obtain the temperature of the battery pack, so that the second signal terminal outputs the temperature of the battery pack.

Further, the battery pack includes a type recognition element, connected to the first signal terminal, where when the battery pack is connected to the external device, the external device may detect the type recognition element by using the first signal terminal to obtain type information of the battery pack.

Further, a nominal voltage of the battery set is greater than or equal to 18 V.

Further, a nominal voltage of the battery set is greater than 54 V.

Further, a nominal voltage of the battery set is about 72 V.

Same as the prior art, the embodiments described here of the present invention have the following beneficial effects: a battery pack outputs an independent state parameter from two paths of communication channels of a first signal terminal and a second signal terminal, notifies an external device of a state of the battery pack, and outputs the state parameter in a dual-backup manner, and when a communication fault occurs in one communication channel, the other communication channel ensures the output of the state parameter, so that the external device can determine the state of the battery pack in time according to the state parameter, to cut off charging or discharging, thereby protecting the battery pack and improving security.

BRIEF DESCRIPTION OF THE DRAWINGS

The foregoing objectives, technical solutions, and beneficial effects of the embodiments of the present invention can be achieved by using the following accompanying drawings.

DETAILED DESCRIPTION

To make the foregoing objects, features and advantages of the embodiments described here of the present invention more comprehensible, detailed description is made to specific implementations of the embodiments of the present invention below with reference to the accompanying drawings. In the following description, many specific details are described to give a full understanding of the embodiments of the present invention. However, the embodiments of the present invention may be implemented in many other manners different from those described herein. A person skilled in the art may make similar improvements without departing from the connotation of the embodiments of the present invention. Therefore, the embodiments of the present invention are not limited to the specific embodiments disclosed below.

It should be noted that, when a component is referred to as "being disposed to" another component, the component may be directly on the another component, or there may be an intermediate component. When a component is considered to be "connected to" another component, the component may be directly connected to the another component, or there may be an intermediate component. The terms "vertical", "horizontal", "left", "right" and similar expressions used in this specification are only for purposes of illustration but not indicate a unique implementation.

Unless otherwise defined, meanings of all technical and scientific terms used in this specification are the same as that usually understood by a person skilled in the technical field to which the embodiments of the present invention belong. In this specification, terms used in the specification of the embodiments of the present invention are merely intended to describe objectives of the specific embodiments, but are not intended to limit the embodiments of the present invention.

Figure 1:
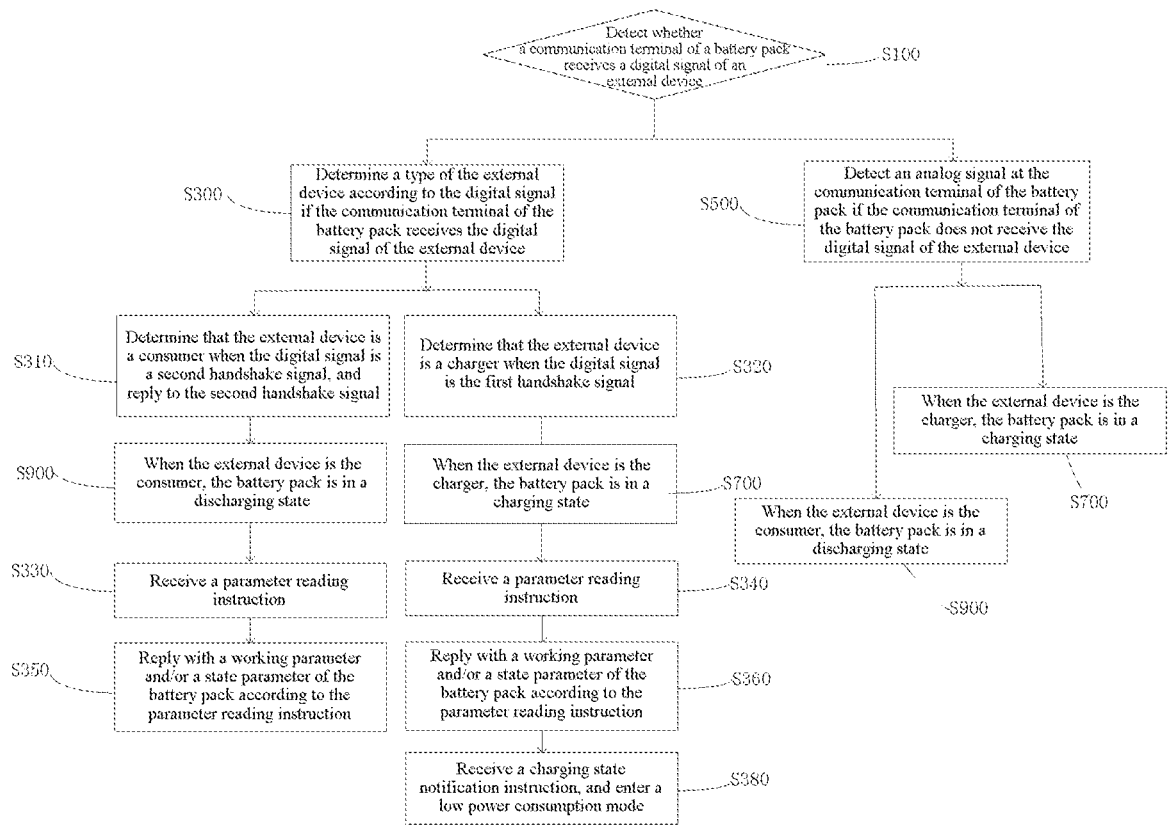
FIG. 1 is a flowchart of a method for recognizing a working status of a battery pack according to an embodiment of this application.

As shown in FIG. 1, any of the embodiments described here of this application provides a method for recognizing a working status of a battery pack. A battery pack is connected to an external device for charging or discharging. The external device includes a consumer and a charger, and a working status includes a charging state and a discharging state. The battery pack includes a communication terminal, and the battery pack establishes communication with the external device when being connected to the external device. The method includes the following steps.

S100. Detect whether the communication terminal of the battery pack receives a digital signal of the external device.

After being powered on, in other words, after a communication function is enabled, the battery pack communicates with the external device. During communication, the external device, as a host, sends a digital signal, and the battery pack, as a slave, receives the digital signal and replies. In any of the embodiments described here, the digital signal may be a handshake signal. First, the battery pack needs to determine whether the external device has a communication function. In other words, after the battery pack is powered on, a control module inside the battery pack detects whether the digital signal sent by the external device is received within a certain time.

S300. Determine a type of the external device according to the digital signal if the communication terminal of the battery pack receives the digital signal of the external device.

The digital signal carries information about the external device, for example, type information of the external device. Different types of external devices may send different digital signals, and the battery pack may recognize a difference between the digital signals, to determine whether the external device is a consumer or a charger. For example, the digital signal may be a handshake signal sent by an external device with a communication function. Source address information carried by handshake signals sent by different external devices is also different. Therefore, after receiving a handshake signal, the battery pack may determine the type of the external device according to a source address of the handshake signal.

S500. Detect an analog signal at the communication terminal of the battery pack if the communication terminal of the battery pack does not receive the digital signal of the external device, and determine the type of the external device according to the analog signal.

If the battery pack does not receive the digital signal within a certain time, it is determined that the external device does not have the communication function, in other words, the battery pack cannot obtain data through the communication function, to learn the type of the external device. In this case, the control module of the battery pack disables the communication function and detects an analog signal at the communication terminal of the battery pack to determine the type of the external device. In any of the embodiments described here, the analog signal may be a voltage state at the communication terminal. In another of the embodiments described here, the control module of the battery pack may alternatively choose not to disable the communication function. The reason is that the battery pack, as a communication slave, is in a receiving state by default, does not actively send data to the communication terminal, and does not affect the detection of the analog signal of the communication terminal.

The communication terminal of the battery pack is configured to be connected to the external device and the external device includes the consumer or the charger. When the charger or the consumer is separately connected to the battery pack, an analog circuit formed by connecting the charger and the communication terminal of the battery pack is different from an analog circuit formed by connecting the consumer and the communication terminal of the battery pack, so that analog signals reflected on the communication terminal are different. Therefore, the battery pack may determine the type of the external device by detecting the analog signal at the communication terminal.

S700. When it is determined that the external device is the charger, the battery pack is in a charging state.

S900. When it is determined that the external device is the consumer, the battery pack is in a discharging state.

According to the method for recognizing a working status of a battery pack and a battery pack provided in any of the embodiments described here, by detecting a digital signal at a communication terminal, the battery pack communicates with an external device and determines whether a charger or a consumer is externally connected, to determine whether charging or discharging is performed. When the external device does not have a communication function, the battery pack may alternatively determine a type of the external device by detecting an analog signal at the communication terminal, in other words, the battery pack may be used for the external device without the communication function and may also be used for the external device with the communication function with a plurality of usage scenarios. In addition, the battery pack can receive the digital signal and can also receive the analog signal through only one port, to determine the type of the external device with a small quantity of ports, and a high degree of integration.

Still referring to FIG. 1, in any of the embodiments described here, the digital signal includes a first handshake signal and a second handshake signal. The determining a type of the external device according to the digital signal includes:

S320. Determine that the external device is the charger when the digital signal is the first handshake signal.

When the handshake signal is the first handshake signal, the battery pack detects the source address of the first handshake signal after receiving the first handshake signal, and may determine that the charger is externally connected. After recognizing the first handshake signal, the battery pack replies to the first handshake signal. After the battery pack recognizes that the external device is the charger, the battery pack performs only over-charge determining in over-charge determining and over-discharge determining. In any of the embodiments described here, the battery pack performs the over-charge determining, in other words, the battery pack determines, by acquiring a voltage of a battery set, whether the battery pack is over-charged. If being over-charged, the battery pack outputs an abnormality signal, and the charger receives the abnormality signal and stops charging, and if not being over-charged, the battery pack enters the charging state.

In another of the embodiments described here, after receiving the handshake signal, if the battery pack cannot recognize the handshake signal, the battery pack replies to the signal that cannot be recognized. In this case, a handshake between the external device and the battery pack fails, and the battery pack determines the type of the external device by detecting the analog signal at the communication terminal.

S340. Receive a parameter reading instruction sent by the charger.

After the handshake between the battery pack and the charger is successful, the battery pack can establish a communication relationship with the charger. During communication, the charger, as a host, sends a command, and the battery pack, as a slave, receives the command. The charger sends a parameter reading instruction every a first preset time, and the battery pack receives the parameter reading instruction from the charger every the first preset time.

S360. Send a working parameter and/or a state parameter of the battery pack according to the parameter reading instruction.

After receiving the parameter reading instruction, the battery pack parses information carried in the parameter reading instruction and sends a corresponding working parameter and/or a corresponding state parameter to the charger.

The working parameter is a fixed parameter determined by the product selection of a battery core of the battery pack, the structure feature of a parallel connection of a battery core string, and the like, and reflects a limit value that allows the battery pack to work. The working parameter has been stored in the battery pack in advance. In any of the embodiments described here, because the external device is the charger, a working parameter corresponding to charging includes a preset charging parameter, and the type of the charging parameter includes preset voltage information, preset current information, and preset temperature information. The preset voltage information may be a maximum allowable charging voltage of the battery pack, the preset current information may be a maximum allowable charging current, and the preset temperature information may be a maximum allowable charging temperature and a minimum allowable charging temperature. The state parameter is a parameter that reflects a current state of the battery pack and will change in real time in a working process of the battery pack and is a variation. In any of the embodiments described here, the state parameter includes any one of a full-pack voltage, a single voltage of a battery core, a battery pack temperature, or a fault state. The fault state may comprises an over-charge fault, an over-discharge fault, an over-temperature fault, an unbalanced fault, or the like, or the fault state may be a specific state caused by over-charged, over-discharged, over-temperature, unbalanced, or the like. The charger may adjust the charging state according to the received working parameter and/or the received state parameter.

S380. Receive a charging state notification instruction sent by the charger, and enter a low power consumption mode, where the charging state notification instruction includes fault information of the charger or full charge information of the battery pack.

It may be understood that the battery pack has a normal power consumption mode and a low power consumption mode. The low power consumption mode has a first power consumption, the normal power consumption mode has a second power consumption, and the first power consumption is less than the second power consumption. The first power consumption or the second power consumption may be a value or may be a value range.

The charger may determine, according to the full-pack voltage of the battery pack in the state parameter received by the communication terminal, whether the battery pack has been fully charged, or the charger may directly detect the full-pack voltage of the battery pack to determine whether the battery pack has been fully charged, or the charger may determine, according to another determining condition, whether the battery pack has been fully charged. If the battery pack has been fully charged, a charging state notification instruction is sent, where the charging state notification instruction carries full charge information of the battery pack. After receiving the charging state notification instruction, the battery pack learns that the battery pack has been fully charged, and the control module controls the battery pack to enter the low power consumption mode from the normal power consumption mode.

In another of the embodiments described here, if the charger determines that a fault occurs in the charger, the charger similarly sends a charging state notification instruction, where the charging state notification instruction carries fault information of the charger. Simultaneously, the charger stops charging the battery pack. After receiving the charging state notification instruction, the battery pack learns that the charger has a fault and cannot perform charging, and the battery pack enters the low power consumption mode.

Further, still referring to FIG. 1, in any of the embodiments described here, after the determining the type of the external device according to the digital signal, the method further includes:

S310. Determine that the external device is the consumer when the digital signal is a second handshake signal.

After receiving a second handshake signal, the battery pack may determine, according to a source address carried in the second handshake signal, that a consumer is externally connected. The battery pack replies to the second handshake signal, a handshake is successful. After recognizing that the external device is the consumer, the battery pack performs only over-discharging determining in over-charge determining and over-discharge determining. In any of the embodiments described here, the battery pack performs the over-discharge determining, in other words, the battery pack determines, by acquiring the voltage of the battery set, whether the battery pack is over-discharged. If being over-discharged, the battery pack outputs an abnormality signal to the outside, and the consumer receives the abnormality signal and stops discharging.

When the battery pack communicates with the consumer, the consumer first sends a second handshake signal every a preset time, and the battery pack replies to the second handshake signal every the preset time. After a handshake is successful, the consumer sends a parameter reading instruction, in other words, the consumer cyclically sends the second handshake signal and the parameter reading instruction. Certainly, the consumer may alternatively send the second handshake signal only once and cyclically send the parameter reading instruction after the handshake is successful.

In another of the embodiments described here, after receiving the second handshake signal, if the battery pack cannot recognize the second handshake signal, the battery pack replies to the signal that cannot be recognized. In this case, the handshake between the external device and the battery pack fails, and the battery pack determines the type of the external device by detecting the analog signal at the communication terminal.

S330. Receive a parameter reading instruction sent by the consumer.

After the handshake between the battery pack and the consumer is successful each time, the battery pack may receive a parameter reading instruction sent by the consumer and parse the parameter reading instruction.

S350. Send the working parameter and/or the state parameter of the battery pack according to the parameter reading instruction.

The battery pack sends a corresponding working parameter and/or a corresponding state parameter to the consumer according to parsed instruction information. In any of the embodiments described here, the working parameter is a fixed parameter determined by the product selection of a battery core of the battery pack, the structure feature of a parallel connection of a battery core string, and the like, and reflects a limit value that allows the battery pack to work. The working parameter has been stored in the battery pack in advance. In any of the embodiments described here, because the external device is the consumer, a working parameter corresponding to discharging includes a preset discharging parameter, and the type of the discharging parameter also includes preset voltage information, preset current information, and preset temperature information. The preset voltage information may be a minimum allowable discharging voltage of the battery pack, the preset current information may be a maximum allowable discharging current, and the preset temperature information may be a maximum allowable discharging temperature and a minimum allowable discharging temperature. The state parameter is a parameter that reflects a current state of the battery pack and will change in real time in a working process of the battery pack and is a variation. In any of the embodiments described here, the state parameter includes any one of a full-pack voltage, a single voltage of a battery core, a battery pack temperature, or a fault state. The fault state may be an over-charge fault, an over-discharge fault, an over-temperature fault, an unbalanced fault, or the like. The consumer may adjust a working status according to the received working parameter and/or the received state parameter.

According to the method for recognizing a working status of a battery pack provided in any of the embodiments described here, the type of an external device may be determined by establishing a communication relationship with the external device and according to a digital signal obtained by the communication terminal, or a type of an external device may be determined by detecting an analog signal at a communication terminal. Therefore, according to the method for a battery pack provided in an of the embodiments described here, a signal on the same terminal is detected, and a type of an external device with a communication function can be detected and a type of an external device without the communication function can also be detected by using two different recognition methods. The method is simple, has a good effect and a high degree of integration, and relies on less hardware ports, and the battery pack applying this method is universal for external devices without communication and with communication on two different platforms with a plurality of usage scenarios and high universality.

In another of the embodiments described here, if the battery pack does not detect the digital signal at the communication terminal within a period of time, it indicates that the external device does not have the communication function, the analog signal at the communication terminal is detected, and the type of the external device is further determined.

In any of the embodiments described here, the battery pack may determine a connection status between the communication terminal and the external device according to the analog signal. It should be noted that, the charger without the communication function has a port adapted to the communication terminal of the battery pack, and the consumer without the communication function does not have a port adapted to the communication terminal. Therefore, when the external device is a device without the communication function, and when the battery pack is separately connected to the charger and the consumer, sizes of voltage states of the analog signal at the communication terminal are different, and connection statuses at the communication terminal are different. The battery pack may determine the type of the external device by detecting the voltage state of the analog voltage at the communication terminal or the connection status at the communication terminal. The battery pack internally stores a preset voltage value. If the battery pack detects that the voltage state of the analog signal at the communication terminal is greater than or equal to the preset voltage value, the connection status at the communication terminal is a connected state, and the battery pack may determine that the external device is the charger. If the battery pack detects that the voltage state of the analog signal at the communication terminal is less than the preset voltage value, the connection status at the communication terminal is an unconnected state, and the battery pack may determine that the external device is the consumer.

In another of the embodiments described here, both the charger and the consumer that do not have the communication function have ports adapted to the communication terminal, but analog circuits at the ports where the charger and the consumer are separately connected to the communication terminal of the battery pack are different, and sizes of voltage states of the analog signal represented on the communication terminal are different. The battery pack determines the type of the external device by detecting a size of the analog signal at the communication terminal. If the voltage state of the analog signal is greater than or equal to the preset voltage value, it is determined that the external device is the charger, and if the voltage state of the analog signal is less than the preset voltage value, it is determined that the external device is the consumer. For example, the charger provides a pull-up resistor with a resistance value of R1 and a pull-up voltage of 5 V for the communication terminal of the battery pack, and the consumer provides a pull-up resistor with a resistance value of R1 and a pull-up voltage of 3.3 V, so that voltage states when the communication terminal of the battery pack is connected to the charger and the consumer are different.

The battery pack provided in any of the embodiments described here may be used for an external device with a communication function and may also be used for an external device without the communication function. When being used for the external device without the communication function, the battery pack may be used for an external device having a port adapted to a communication terminal and may also be used for a consumer that does not have a port adapted to the communication terminal, and an application scenario is wide.

Figure 2:
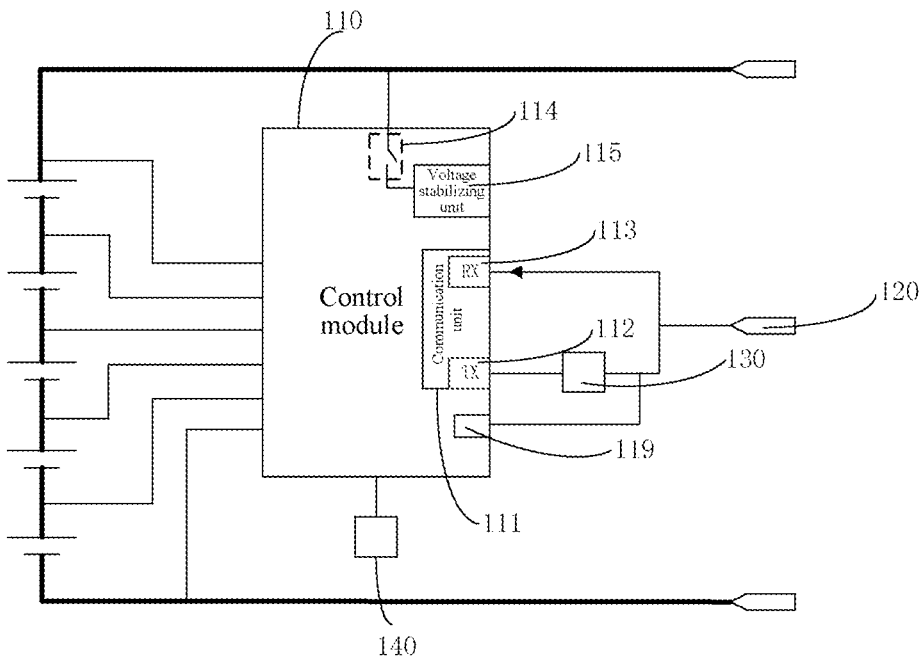
FIG. 2 is a schematic structural diagram of a battery pack according to an embodiment of this application.

Referring to FIG. 2, another of the embodiments described here of this application provides a battery pack, including a control module 110 and a communication terminal 120. The communication terminal 120 is configured to be connected to an external device, and the type of the external device includes a consumer and a charger. In any of the embodiments described here, the control module 110 may be a microcontroller unit (MCU).

After the battery pack is connected to the external device, the control module 110 is configured to detect whether a digital signal is received from the communication terminal 120 within a preset time. In any of the embodiments described here, the digital signal may be a handshake signal sent by the external device. When detecting the digital signal by using the communication terminal 120, the control module 110 may determine the type of the external device according to the digital signal.

When the control module 110 does not detect the digital signal within the preset time, the control module 110 determines that the external device does not have a communication function. In this case, the control module 110 detects an analog signal at the communication terminal 120 to determine the type of the external device.

When the control module 110 determines that the external device is the charger, the battery pack is in a charging state. When it is determined that the external device is the consumer, the battery pack is in a discharging state.

The battery pack provided in any of the embodiments described here communicates with an external device by detecting a digital signal at a communication terminal and determines whether a charger or a consumer is externally connected, to determine whether charging or discharging is performed. When the external device does not have a communication function, the battery pack may alternatively determine the type of the external device by detecting an analog signal at the communication terminal, in other words, the battery pack may be used for the external device without the communication function and may also be used for the external device with the communication function with a plurality of usage scenarios. In addition, the battery pack can receive the digital signal and can also receive the analog signal through only one port, to determine the type of the external device, with a small quantity of ports and a high degree of integration.

In any of the embodiments described here, the control module 110 further includes a communication unit 111 and a working status recognition interface 119. The communication unit 111 includes a sending interface 112 and a receiving interface 113. The sending interface 112, the receiving interface 113, and the working status recognition interface 119 are all connected to the communication terminal 120. The battery pack further includes a conversion module 130, one end of the conversion module 130 is connected to the sending interface 112, and the other end is connected to the communication terminal 120. The conversion module 130 is configured to transmit a signal sent by the communication unit 111 to the external device, and prevent a signal of the external device from flowing to the communication unit 111 through the sending interface 112, so that the signal sent by the external device flows to the communication unit 111 only through the communication terminal 120 and the receiving interface 113. In any of the embodiments described here, the conversion module 130 may be a switch controlled by the communication unit 111.

A sending state or a receiving state may be set for the communication unit 111. The communication unit 111 sends to-be-transmitted data from the communication terminal 120 to the outside through the sending interface 112 when being in the sending state, and the communication unit 111 obtains data from the communication terminal 110 through the receiving interface 113 when being in the receiving state. It may be understood that the communication unit 111 further includes a register, which may be configured to register a received digital signal or a to-be-sent digital signal. The control module 110 may determine, by detecting the register of the communication unit 111, whether the digital signal of the external device is received. When the digital signal is received, the type of the external device may be determined according to the digital signal. If the digital signal is not received, the control module 110 detects the analog signal at the communication terminal 120 to determine the type of the external device.

In any of the embodiments described here, the communication unit 111 may be a serial communication unit, and the communication terminal 120 may be a half-duplex serial interface. The communication unit 111 performs serial communication with the external device by using the communication terminal 120, to receive the digital signal of the external device.

In any of the embodiments described here, if the communication unit 111 receives a digital signal within a preset time, the external device has the communication function, and the communication unit 111 may recognize the type of the external device according to the digital signal. In any of the embodiments described here, the digital signal may be a handshake signal. Handshake signals sent by different external devices are also different. When receiving a first handshake signal, the communication unit 111 may determine, by parsing a source address carried in the first handshake signal, that the charger is externally connected. When receiving a second handshake signal, the communication unit 111 may determine, by parsing a source address carried in the second handshake signal, that the consumer is externally connected. After the communication unit 111 receives the handshake signal and replies with agreement, a handshake is successful, the battery pack enters a charging state or a discharging state, and performs a real-time communication with the external device in a charging or discharging process. When the battery pack communicates with the external device, the communication terminal 120, as a terminal, can both send and receive data, but cannot send and receive the data simultaneously. The communication unit 111 performs serial communication with the external device by using the communication terminal 120.

In any of the embodiments described here, when the external device has the communication function, and after the handshake between the external device and the battery pack is successful, the digital signal sent to the battery pack includes a parameter reading instruction. When receiving the parameter reading instruction from the communication terminal 120, the control module 110 of the battery pack sends a corresponding working parameter and/or a corresponding state parameter to the external device by using the communication unit 111. After receiving the working parameter and/or the state parameter, the external device may control a charging process or a discharging process of the battery pack.

When the external device is the charger, the working parameter includes a preset charging parameter, and the type of the charging parameter includes preset voltage information, preset current information, and preset temperature information. The preset voltage information may be a maximum allowable charging voltage of the battery pack, the preset current information may be a maximum allowable charging current, and the preset temperature information may be a maximum allowable charging temperature and a minimum allowable charging temperature. The state parameter includes any one of a full-pack voltage of the battery pack, a single voltage of a battery core, a battery pack temperature, or a fault state.

When the external device is the consumer, the working parameter includes a preset discharging parameter, and the type of the discharging parameter includes preset voltage information, preset current information, and preset temperature information. The preset voltage information may be a maximum allowable discharging voltage of the battery pack, the preset current information may be a maximum allowable discharging current, and the preset temperature information may be a maximum allowable discharging temperature and a minimum allowable discharging temperature. The state parameter includes any one of a full-pack voltage of the battery pack, a single voltage of a battery core, a battery pack temperature, or a fault state.

In any of the embodiments described here, when the battery pack recognizes different types of external devices, the battery pack performs different controls, for example, data transmitted by using the communication terminal to the outside is different. Therefore, the battery pack is more intelligent, and the battery pack is prevented from performing extra control actions, thereby improving efficiency.

In any of the embodiments described here, when the external device is the charger having the communication function, and after the handshake between the external device and the battery pack is successful, the digital signal sent to the battery pack includes a charging state notification instruction. After receiving a full-pack voltage of the battery pack from the communication terminal 120 or obtaining a full-pack voltage of the battery pack by acquiring positive and negative electrodes of the battery pack, the charger may determine, according to a preset full charge cutoff voltage, whether the battery pack is fully charged. When the charger determines that the battery pack has been fully charged, the charger sends the charging state notification instruction, where the charging state notification instruction carries full charge information of the battery pack. When the charger detects that the charger has a fault, the charger sends a charging state notification instruction, where the charging state notification instruction carries fault information of the charger, and stops charging the battery pack. The battery pack has a low power consumption mode and a normal power consumption mode, the low power consumption mode has a first power consumption, the normal power consumption mode has a second power consumption, and the first power consumption is less than the second power consumption. The first power consumption or the second power consumption may be a value or may be a value range. When receiving the charging state notification instruction from the communication terminal, the control module 110 controls the battery pack to be switched from the normal power consumption mode to the low power consumption mode, to reduce a power consumption when the battery pack is not used.

Specifically, still referring to FIG. 2, in any of the embodiments described here, the control module 110 may be an MCU, and both a power supply switch 114 and a voltage stabilizing unit 115 are disposed inside the MCU. One end of the power supply switch 114 is connected to a positive electrode of a battery set 150, and the other end is connected to the voltage stabilizing unit 115. The voltage stabilizing unit 115 is configured to convert a voltage of the battery set 150 to working power. On one hand, the working power is supplied to the MCU, and on the other hand, the working power is outputted by using a pin of the MCU and is supplied to another working circuit in the battery pack. After receiving the charging state notification instruction, the control module 110 controls the power supply switch 114 to be opened, so that the voltage stabilizing unit 115 cannot output the working power, the MCU and the another working circuit in the battery pack do not work, and the battery pack may enter the low power consumption mode from the normal power consumption mode. When the battery pack enters the low power consumption mode, a battery of the battery pack always has a self-discharge loss, and an internal power consumption of the battery pack approaches 0.5 uA and is almost 0. Therefore, the battery pack enters the low power consumption mode after being fully charged, the power consumption of the battery pack can be reduced, and energy is saved.

Certainly, in another of the embodiments described here, the power supply switch 114 and the voltage stabilizing unit 115 may be alternatively disposed outside the MCU, and the working power outputted by the voltage stabilizing unit 115 is supplied to the MCU and a peripheral working circuit of the battery pack. After receiving the charging state notification instruction, the MCU controls the power supply switch 114 to be opened, so that the voltage stabilizing unit 115 cannot output the working power, both the MCU and another working circuit are powered off, and the power consumption inside the battery pack is 0.

In any of the embodiments described here, the control module 110 may further send a battery pack type signal to the external device by using the communication unit 111. After receiving the battery pack type signal, the external device recognizes the type of the battery pack and adjusts a corresponding charging current or a corresponding discharging current to adapt to the battery pack.

In any of the embodiments described here, the battery pack further includes a temperature detection module 140, connected to the control module 110 and configured to acquire temperature information of the battery pack and send the temperature information of the battery pack to the external device by using the communication terminal 120. The external device may determine, according to the received temperature information, whether over-temperature occurs in the battery pack. If the over-temperature occurs in the battery pack, the external device is disconnected from the battery pack, so that charging and discharging are stopped for the battery pack.

In any of the embodiments described here, when the communication unit 111 does not receive the digital signal of the external device within the preset time, the control module 110 detects the analog signal at the communication terminal 120 to determine the type of the external device.

It should be noted that, the charger without the communication function has a port adapted to the communication terminal 120 of the battery pack, and an external power supply and a pull-up resistor are disposed at the port of the charger. When the charger is connected to the battery pack, the battery pack may detect the analog signal by using the communication terminal 120. The consumer without the communication function does not have a port adapted to the communication terminal 120 of the battery pack. When the consumer is connected to the battery pack, the communication terminal 120 of the battery pack is suspended. It may be learned that when the battery pack is separately connected to the charger and the consumer, sizes of voltage states of the analog signal at the communication terminal are different, and connection statuses at the communication terminal are different. Therefore, the control module 110 may determine the type of the external device by detecting the voltage state of the analog signal at the communication terminal or detecting the connection status at the communication terminal 120. If the battery pack detects that the voltage state of the analog signal at the communication terminal 120 is greater than or equal to a preset voltage value, the connection status at the communication terminal 120 is a connected state, and the battery pack may determine that the external device is the charger. If the battery pack detects that the voltage state of the analog signal at the communication terminal 120 is less than the preset voltage value, the connection status at the communication terminal 120 is an unconnected state, and the battery pack may determine that the external device is the consumer.

In another of the embodiments described here, both the charger and the consumer that do not have the communication function have ports adapted to the communication terminal 120, but analog circuits at the ports where the charger and the consumer are separately connected to the communication terminal of the battery pack are different, and sizes of voltage states of the analog signal represented on the communication terminal are different. The battery pack determines the type of the external device by detecting the size of the analog signal at the communication terminal 120. If the voltage state of the analog signal is greater than or equal to the preset voltage value, it is determined that the external device is the charger, and if the voltage state of the analog signal is less than the preset voltage value, it is determined that the external device is the consumer. For example, the charger provides a pull-up resistor with a resistance value of R1 and a pull-up voltage of 5 V for the communication terminal of the battery pack, and the consumer provides a pull-up resistor with a resistance value of R1 and a pull-up voltage of 3.3 V, so that voltage states when the communication terminal of the battery pack is connected to the charger and the consumer are different.

Specifically, the battery pack further includes a type recognition element 180, one end of the type recognition element is connected to the communication terminal 120, and the other end is grounded. The type recognition element 180 is preferably a resistor and represents type information of the battery pack. The type recognition elements 180 of the battery packs of different types are different, and resistance values are different. The external device may detect the type recognition element 180 by using the communication terminal 120, to learn the type of the battery pack.

The battery pack provided in any of the embodiments described here may be not only used for an external device without a communication function, but also used for an external device with the communication function with wide universality. The battery pack may recognize the type of the external device with the communication function and the type of the external device without the communication function by using one port with a small quantity of ports and a plurality of functions. After the battery pack establishes communication with the external device with the communication function, the battery pack may transmit data to the outside according to a parameter reading instruction for querying data sent by the external device and instruct a charging process or a discharging process when matching the external devices on different platforms, with high universality, and may further enter a low power consumption state according to a charging state notification instruction that carries with full charge information of the battery pack or fault information of the charger and is fed back by the charger, thereby reducing the power consumption when the battery pack is not used and saving energy.

Figure 3:
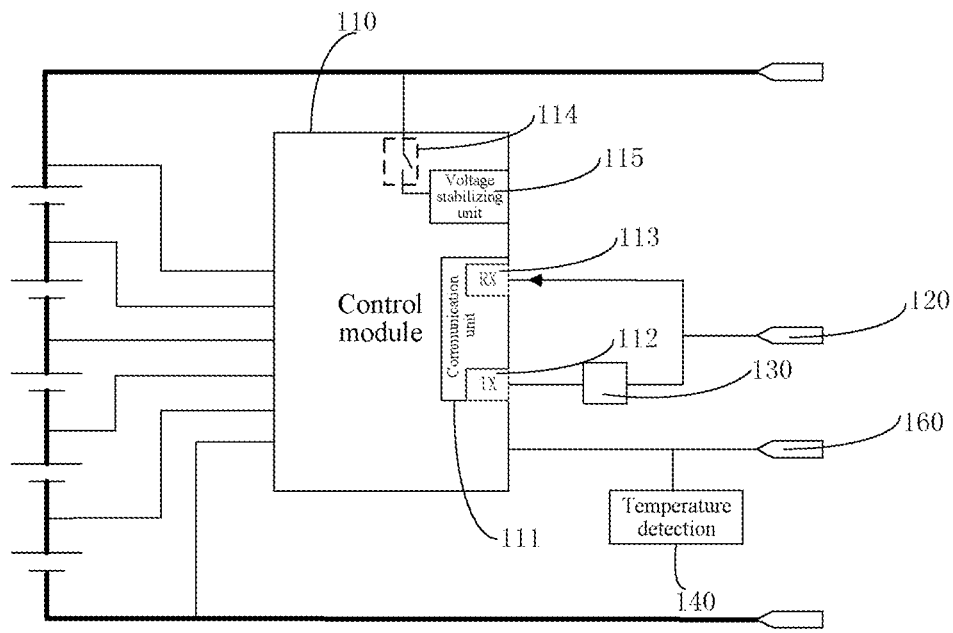
FIG. 3 is a schematic structural diagram of a battery pack according to another embodiment of this application.

Referring to FIG. 3, in any of the embodiments described here, the battery pack includes the battery set 150, the control module 110, a first terminal 120, and a second terminal 160. The first terminal 120 is the communication terminal 120, and the second terminal 160 is a state indication terminal. The first terminal 120 and the second terminal 160 are connected to the control module 110 and are both configured to be connected to an external device, and the type of the external device includes a consumer or a charger.

The battery set 150 includes a plurality of battery cores connected in series, and the control module 110 has a plurality of pins, respectively connected to two ends of each battery core and configured to acquire a single voltage of each battery core. A first voltage and a second voltage are preset inside the control module 110, and the first voltage is greater than the second voltage. The control module 110 is configured to compare the acquired single voltage with the first voltage or the second voltage and determine whether the battery set 150 is over-charged or over-discharged. In any of the embodiments described here, the control module 110 may be a microcontroller unit (MCU). A data processing unit is disposed in the MCU and is configured to perform data processing on the acquired single voltage.

The control module 110 further detects the type of the external device by using the first terminal 120. When the external device is the charger, the control module 110 only determines whether the battery pack is in an over-charge state and does not determine whether the battery pack is in an over-discharge state. In other words, the control module 110 compares the acquired single voltage with the first voltage but not with the second voltage. If a single voltage of any one of the battery cores is greater than the first voltage, the battery pack is in the over-charge state, and the control module 110 outputs an abnormality signal by using the second terminal 160. Even if a single voltage is less than the second voltage, the control module 110 still controls the battery pack to enter a charging state.

When the control module 110 detects that the external device is the consumer by using the communication terminal 120, the control module 110 only determines whether the battery pack is in the over-discharge state and does not determine whether the battery pack is in the over-charge state. In other words, the control module 110 compares the acquired single voltage with the second voltage but not with the first voltage. If a single voltage of any one of the battery cores is less than the second voltage, the battery pack is in the over-discharge state, and the control module 110 outputs the abnormality signal by using the second terminal 160. Even if a single voltage is greater than the first voltage, the control module 110 still controls the battery pack to enter a discharging state.

According to the battery pack provided in any of the embodiments described here, a control module 110 is capable of determining whether the battery pack is in an over-charge state or an over-discharge state, and when the battery pack is over-charged or over-discharged, the control module 110 outputs abnormality signals from the same port without a plurality of ports, thereby improving a degree of integration of the port. Compared with a case that a control module performs over-charge determining and over-discharge determining simultaneously when a battery pack is connected to an external device and outputs the same abnormality signal in the conventional technology, the external device cannot determine whether over-charge or over-discharge occurs according to the abnormality signal. Consequently, in the conventional technology, if over-discharge occurs and a charger is connected, the charger cannot charge the battery pack because the abnormality signal is received, and if over-charge occurs and a consumer is connected, the battery pack cannot discharge the consumer because the consumer receives the abnormality signal. In this application, the type of the external device is first determined, if the external device is the charger, only the over-charge determining is performed and the over-discharge determining is not performed, and if the external device is the consumer, only the over-discharge determining is performed and the over-charge determining is not performed, to improve a degree of intelligence of the battery pack.

It may be understood that before the over-charge determining or the over-discharge determining is performed, there is a step of recognizing the type of the external device. In any of the embodiments described here, the control module 110 may detect whether the communication unit 111 receives a digital signal of the external device and determine the type of the external device according to the digital signal if the digital signal is received, and if the digital signal is not received, the control module 110 determines the type of the external device by detecting an analog signal at the communication terminal 120. A specific determining manner is as described above. Details are not described herein again. Further, the digital signal further includes a parameter reading command and/or a charging state notification command. The control module receives the digital signals and performs corresponding control-outputs a working parameter and/or a state parameter-controls the battery pack to enter a low power consumption mode. A specific control process and an effect are as described above, and details are not described herein again.

Figure 4:
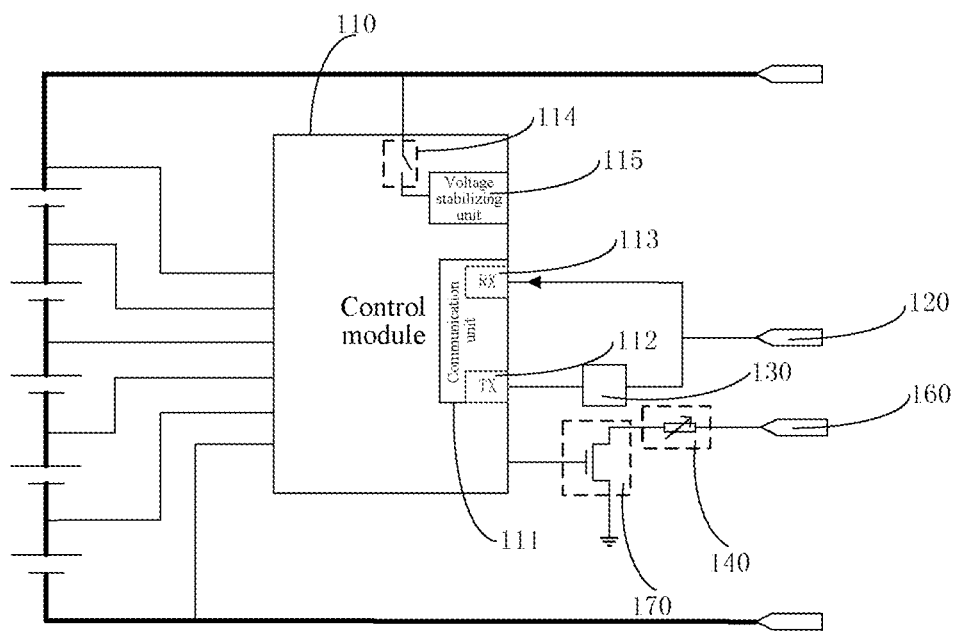
FIG. 4 is a schematic structural diagram of a battery pack according to another embodiment of this application.

Referring to FIG. 4, in any of the embodiments described here, the battery pack further includes a switch module 170, and the switch module 170 includes a control end, a first end, and a second end. The control end of the switch module 170 is connected to the control module and is configured to receive a control signal of the control module 110 and be turned on or opened according to the control signal. The first end of the switch module 170 is connected to the second terminal 160, and the second end of the switch module 170 is grounded.

When the control module 110 detects that the external device is the charger by using the first terminal 120 and detects that the battery pack is in the over-charge state by detecting a single voltage, or when the control module 110 detects that the external device is the consumer by using the first terminal 120 and detects that the battery pack is in the over-discharge state by detecting a single voltage, the control module 110 sends a first control signal to the control end of the switch module 170 and controls the switch module 170 to be opened, so that the external device detects that the second terminal 160 is suspended, in other words, the second terminal 160 outputs an abnormality signal. When detecting that the second terminal 160 is suspended, the external device is disconnected from the battery pack and stops a charging or discharging process.

Specifically, in any of the embodiments described here, the switch module 170 may include at least one transistor, the transistor may be an N-type transistor or may be a P-type transistor. In any of the embodiments described here, a description is made by using an example in which the switch module includes one N-type transistor. A control end of the N-type transistor is a gate, a first end is a drain, and a second end is a source. The control gate of the N-type transistor is connected to the control module 110, the drain is connected to the second terminal 160, and the source is grounded. When the battery pack is connected to the charger and the control module 110 detects that the battery pack is over-charged, or when the battery pack is connected to the consumer and the control module 110 detects that the battery pack is over-discharged, the control signal sent by the control module 110 is a low-level signal, and the N-type transistor is opened under the control of the low-level signal, so that a path from the second terminal 160 to the control module 110 is broken. When detecting an infinite signal at the second terminal 160, the external device may determine that the battery pack has a fault, and the external device is disconnected from the battery pack, and charging and discharging are stopped for the battery pack.

In any of the embodiments described here, the battery pack further includes the temperature detection module 140, and the first end of the temperature detection module 140 is connected to the first end of the switch module 170. The second end is connected to the second terminal 160. When the battery pack is connected to the charger and the control module 110 detects that the battery pack is not over-charged, or when the battery pack is connected to the consumer and the control module 110 detects that the battery pack is not over-discharged, the control module 110 controls the switch module 170 to be turned on, so that the external device is connected to the temperature detection module 140 by the second terminal 160, to read temperature information of the battery pack. The first end of the temperature detection module 140 is further connected to the control module 110, and the temperature detection module is configured to send acquired temperature information of the battery pack to the control module 110.

Specifically, in any of the embodiments described here, the temperature detection module 140 may be a thermistor, and the switch module 170 may be the N-type transistor. One end of the thermistor is connected to the drain of the N-type transistor, the source of the N-type transistor is grounded, and the other end of the thermistor is connected to the second terminal 160. When the external device is connected to the battery pack, an external power supply and a pull-up resistor are disposed at a port where the external device is connected to the second terminal 160, the external power supply and the pull-up resistor are grounded by using the thermistor and the N-type transistor, and the external device may read the temperature information of the battery pack by reading a resistance value of the thermistor. When determining that over-temperature occurs in the battery pack, the external device is disconnected from the battery pack, so that charging or discharging is stopped for the battery pack.

The battery pack provided in any of the embodiments described here includes the second terminal 160, connected to the external device. When the battery pack is connected to the external device, the battery pack may output an abnormality signal by using the second terminal 160, so that the external device is disconnected from the battery pack after receiving the abnormality signal. In addition, the battery pack may further output a temperature of the battery pack to the external device by using the second terminal 160. Therefore, two types of signals may be outputted by using one port, port multiplexing is implemented, and a quantity of ports of the battery pack is reduced.

In any of the embodiments described here, the control module 110 further includes the communication unit 111 and a working status recognition interface 119, and a connection circuit between the communication unit 111 and the working status recognition interface 119 and functions implemented by the communication unit and the working status recognition interface are the same as that in the foregoing embodiments. Details are not described again.

In any of the embodiments described here, when determining whether the battery pack is in the over-charge state or the over-discharge state, the control module 110 further outputs an abnormality signal from the first terminal 120 by using the communication unit 111, and the external device receives the abnormality signal and stops charging or discharging. Therefore, when an over-charge fault or an over-discharge fault occurs in the battery pack, the first terminal 120 and the second terminal 160 output abnormality signals in a dual-backup manner, to notify the external device that a fault has occurred in the battery pack, thereby ensuring security.

Figure 5:
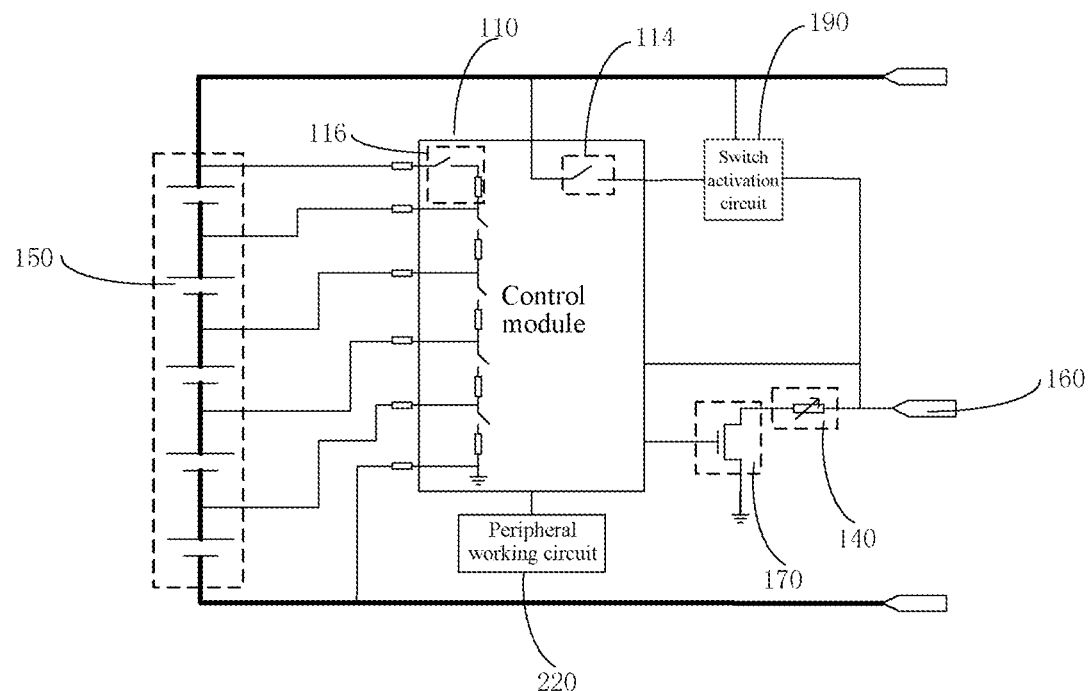
FIG. 5 is a schematic structural diagram of a battery pack according to another embodiment of this application.

Referring to FIG. 5, in any of the embodiments described here, the battery pack includes the battery set 150, a state indication terminal 160, and the control module 110. The state indication terminal 160 is the second terminal 160 as described above. The state indication terminal is connected to the control module 110 and is configured to be connected to the external device. The control module 110 is connected to each battery core in the battery set 150, and is configured to acquire a single voltage of each battery core and determine whether the battery set 150 is in an unbalanced state according to the single voltage. When the battery set 150 is in the unbalanced state, the control module controls the state indication terminal 160 to output an abnormality signal. After receiving the abnormality signal, the external device stops charging or discharging.

Specifically, the control module 110 stores a first preset difference. At charging and discharging stages, the control module 110 is further configured to determine a maximum voltage value and a minimum voltage value according to the acquired single voltages and calculate a voltage difference between the maximum voltage value and the minimum voltage value. When the voltage difference between the maximum voltage value and the minimum voltage value is greater than or equal to the pre-stored first preset difference, the control module 110 determines that the battery pack is in the unbalanced state. In this case, the battery pack is in a fault state. Therefore, the control module 110 controls the switch module 170 to be opened, so that the second terminal 160 outputs an abnormality signal. After receiving the abnormality signal, the external device may be disconnected from the battery pack and stops charging or discharging.

The battery pack provided in any of the embodiments described here may acquire a single voltage of each battery core and determine whether the battery pack is in an unbalanced state according to the single voltage, and when the battery pack is in the unbalanced state, the battery pack outputs an abnormality signal to the outside, so that after receiving the abnormality signal, the external device controls stopping of charging or discharging. Therefore, stopping of the charging and discharging processes is not required inside the battery pack, thereby simplifying the structure of the battery pack and reducing costs of the battery pack.

In any of the embodiments described here, after acquiring the single voltage, the control module 110 may further compare the single voltage with a pre-stored first voltage and a pre-stored second voltage. If the single voltage is greater than the first voltage, the battery pack is in the over-charge state, and the control module 110 outputs an abnormality signal from the second terminal 160. If the single voltage is less than the second voltage, the battery pack is in the over-discharge state, and the control module 110 outputs an abnormality signal from the second terminal 160.

According to the battery pack provided in any of the embodiments described here, when an over-charge fault, an over-discharge fault, or an unbalanced fault occurs in the battery pack, all abnormality signals are outputted from the same port, in other words, the second terminal 160, to the external device. Therefore, signals in a plurality of states can be outputted by using one port, to improve a degree of integration of the port.

In any of the embodiments described here, the battery pack further includes the switch module 170, and the control module 110 is connected to the state indication terminal 160 by the switch module 170. The switch module 170 includes a control end, a first end, and a second end. The control end of the switch module 170 is connected to the control module and is configured to receive a control signal of the control module 110 and be turned on or opened according to the control signal. The first end of the switch module 170 is connected to the second terminal 160, and the second end of the switch module 170 is grounded.

When the control module 110 detects that the battery pack is in the over-charge state by detecting a single voltage, or when the control module 110 detects that the battery pack is in the over-discharge state by detecting a single voltage, or when the control module 110 determines that the battery pack is in the unbalanced state, the control module 110 sends a first control signal to the control end of the switch module 170 and controls the switch module 170 to be opened, so that the external device detects that the second terminal 160 is suspended, in other words, the second terminal 160 outputs an abnormality signal. When detecting that the second terminal 160 is suspended, the external device is disconnected from the battery pack and stops a charging or discharging process. In any of the embodiments described here, the battery pack further includes the temperature detection module 140, and a connection circuit between the temperature detection module 140 and the switch module 170 and a control manner are as described above. Details are not described again.

In any of the embodiments described here, further, the first end of the temperature detection module is further connected to the control module and the temperature detection module is configured to send acquired temperature information of the battery pack to the control module. Therefore, the first terminal transmits temperature data to the external device and further transmits the temperature data to the control module inside the battery pack.

In any of the embodiments described here, the control module 110 is further configured to compare single voltages at a charging stage and determine a minimum voltage value. In addition, the control module 110 is further configured to calculate a voltage difference between a single voltage of each battery core and the minimum voltage value and determine whether capacities of the battery cores in the battery pack are balanced according to the voltage difference and a pre-stored second preset difference. If a voltage difference between each battery core and a battery core with a minimum capacity is less than the second preset difference, the capacities of the battery cores in the battery pack are balanced. If a difference between at least one battery core with a capacity and the battery core with the minimum capacity is greater than the second preset difference, the capacities of the battery cores in the battery pack are not balanced. In this case, a battery core on which power equalization needs to be performed is set to a target battery core, and a battery core on which power equalization does not need to be performed is set to a normal battery core. A voltage difference between a single voltage of the target battery core and the minimum voltage value is greater than or equal to the second preset difference, and a voltage difference between a single voltage of the normal battery core and the minimum voltage value is less than the second preset difference. In any of the embodiments described here, the second preset difference is 30 mV. Certainly, the second preset difference may be alternatively another value, and a user may set the second preset difference according to requirements.

After the target battery core is determined, the target battery core is discharged according to a preset equalization period. Each equalization period includes an equalization stage and a detection stage after the equalization stage. At the equalization stage, the first determined target battery core is discharged. At the detection stage, the control module 110 detects a single voltage of each battery core again and determines a minimum voltage value again according to the single voltage. It should be noted that, the minimum voltage value is obtained by comparing the single voltages in real time. At the equalization stage, the target battery core is discharged and each battery core is in the charging state. Therefore, the minimum voltage value may vary at each detection stage, and the minimum voltage value needs to be determined again by comparing the single voltages. The voltage difference between the single voltage of the target battery core and the minimum voltage value is compared with a third preset difference. When the voltage difference is less than the third preset difference, the control module controls the target battery core to be converted into a normal battery core. In addition, the control module compares the voltage difference between the single voltage of the normal battery core at the previous stage and the minimum voltage value with the second preset difference. When the voltage difference is greater than or equal to the second preset difference, the normal battery core is converted into a target battery core. The equalization period is repeated until the detection stage is ended, the control module 110 detects that there is no target battery core in the battery cores, equalization is ended, and if there is a target battery core, a next equalization period is entered. In any of the embodiments described here, the third preset difference is less than the second preset difference. Specifically, the third preset difference may be 10 mV. Certainly, the user may also select the third preset difference according to requirements.

Further, still referring to FIG. 5, in any of the embodiments described here, the control module 110 further includes at least one bleeder unit 116, and each bleeder unit 116 is connected to each battery core in a one-to-one correspondence. Each bleeder unit 116 includes one bleeder switch and one bleeder resistor, one end of the bleeder switch is connected to a battery core and one end of a bleeder resistor of a previous stage, and the other end is connected to one end of a bleeder resistor corresponding to a battery core of a present stage. In the equalization period, after determining the target battery core, the control module 110 controls a bleeder switch in other words correspondingly connected to the target battery core to be closed, so that the target battery core is discharged by using a bleeder resistor. In the detection period, the control module 110 controls the bleeder switch corresponding to the target battery core to be opened, to stop discharging of the target battery core.

According to the battery pack provided in any of the embodiments described here, during charging and discharging, a control module of the battery pack may further detect whether voltages of battery cores in the battery pack are balanced, and if the voltages are not balanced, a target battery core is discharged in a periodic discharge manner, so that the voltage is balanced.

In any of the embodiments described here, still referring to FIG. 5, the battery pack further includes a switch activation circuit 190 and a peripheral working circuit 220, and the control module 110 is further connected to the state indication terminal 160 by the switch activation circuit 190. The control module 110 includes a power supply switch 114, and the power supply switch 114 is connected to the battery set 150, so that the battery set 150 supplies power to the control module 110 and the peripheral working circuit 220 by using the power supply switch 114. After the switch activation circuit 190 obtains an activation signal of the external device by using the state indication terminal 160, the switch activation circuit 190 controls the power supply switch to be turned on, and the battery set 150 may supply power to the control module 110 and the peripheral working circuit 220, so that the battery pack may be switched from the low power consumption mode to the normal power consumption mode.

In another of the embodiments described here, still referring to FIG. 5, the control module 110 is provided with a connection status recognition interface, and the control module 110 is directly connected to the state indication terminal 160 by the connection status recognition interface. The control module 110 internally stores a connection recognition preset voltage, where the connection recognition preset voltage is used for determining whether the external device is connected to the battery pack.

It should be noted that, the external device has a port adapted to the state indication terminal 160 and a power supply and a pull-up resistor are disposed at the port of the external device. When the external device is connected to the battery pack, there is a voltage state at the state indication terminal 160, and when the external device is disconnected from the battery pack, the state indication terminal is suspended.

Specifically, the control module 110 detects the voltage state at the state indication terminal 160 to determine whether the external device is connected. When the voltage state at the state indication terminal 160 is greater than or equal to the connection recognition preset voltage, the battery pack is connected to the external device. When the voltage state at the state indication terminal 160 is less than the connection recognition preset voltage, the battery pack is disconnected from the external device. In this case, the battery pack enters the low power consumption mode from the normal power consumption mode.

Figure 6:
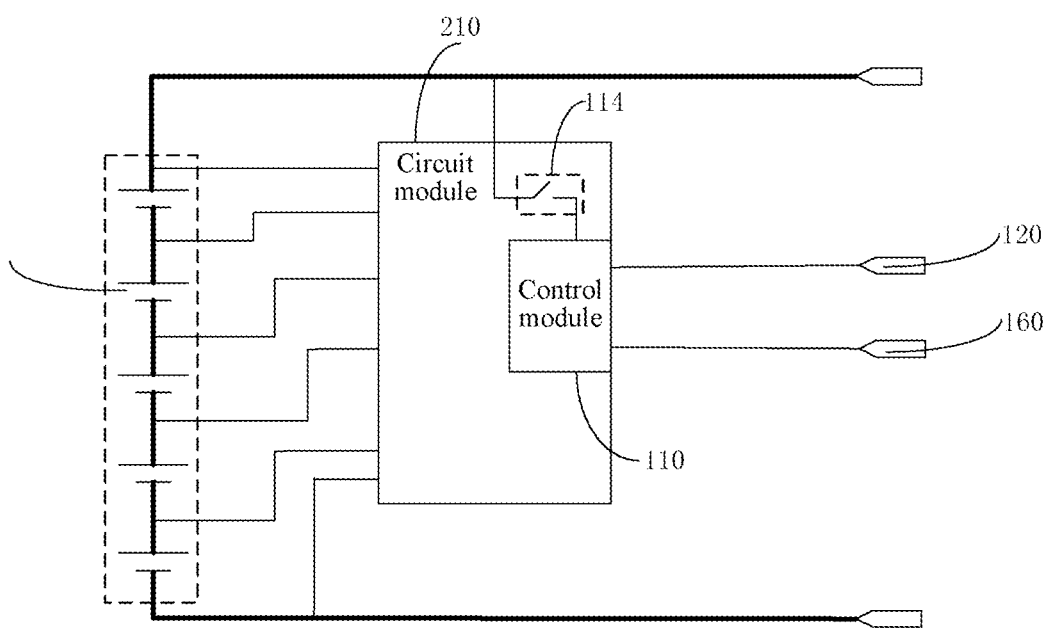
FIG. 6 is a schematic structural diagram of a battery pack according to another embodiment of this application.

Referring to FIG. 6, in any of the embodiments described here, the battery pack includes the battery set 150 and a circuit module 210 connected to the battery set. The circuit module 210 is a working circuit of the battery pack and may be formed by a hardware circuit or may be formed by a chip and a peripheral circuit of the chip. The circuit module 210 is powered by the battery set 150 and works. The circuit module 210 has a low power consumption mode and a normal power consumption mode. The low power consumption mode has a first power consumption, the normal power consumption mode has a second power consumption, and the first power consumption is less than the second power consumption. It may be understood that the first power consumption or the second power consumption may be a value or may be a value range. For example, the first power consumption is A, the second power consumption is B, and A>B. For example, the first power consumption is between A1 and A2, the second power consumption is between B1 and B2, and A2>A1>B2>B1. For example, the first power consumption is A, the second power consumption is between B1 and B2, and A>B2>B1. It may be understood that when the circuit module 210 enters the low power consumption mode, in other words, the entire battery pack enters the low power consumption mode, and when the circuit module 210 enters the normal power consumption mode, in other words, the entire battery pack enters the normal power consumption mode. The circuit module 210 is powered on and works in the normal power consumption mode. In this case, the circuit module 210 can enter various detection and control as follows.

When the circuit module 210 learns that the battery set 150 has been fully charged, the circuit module 210 is switched from the normal power consumption mode to the low power consumption mode, to reduce a power consumption when the battery pack does not work.

The battery pack has a plurality of parallel conditions of entering the low power consumption mode, and when any one of the conditions occurs, the circuit module 210 is switched from the normal power consumption mode to the low power consumption mode. This is listed one by one below.

Still referring to FIG. 6, in any of the embodiments described here, the battery pack includes the first terminal 120, and the first terminal 120 is connected to the circuit module 210 and is configured to be connected to the external device.

When the external device is a charger, and the charger has a communication function, and after a handshake between the charger and the battery pack is successful, the charger sends a parameter reading instruction. After receiving the parameter reading instruction, the battery pack sends a corresponding working parameter and/a corresponding state parameter to the charger. In any of the embodiments described here, the state parameter includes any one of a full-pack voltage, a single voltage of a battery core, a battery pack temperature, or a fault state. After receiving the full-pack voltage of the battery pack, the charger may determine, according to a preset full charge cutoff voltage, whether the battery pack has been fully charged. If the full-pack voltage is greater than the full charge cutoff voltage, the battery pack has been fully charged, and the charger sends a charging state notification instruction carrying full charge information of the battery pack to the first terminal 120 and stops charging the battery pack. After receiving the charging state notification instruction, the circuit module 210 learns that the battery pack has been fully charged, and controls the battery pack to enter the low power consumption mode from the normal power consumption mode.

In any of the embodiments described here, the battery set 150 further includes battery cores connected in series, and the circuit module 210 is connected to each battery core and is configured to acquire a single voltage of each battery core and determine, according to the single voltage, whether the battery pack is fully charged. When it is determined that the battery set is fully charged, in other words, when the circuit module 210 learns that the battery set has been fully charged, the circuit module 210 is switched from the normal power consumption mode to the low power consumption mode.

In any of the embodiments described here, the circuit module 210 is further configured to detect at least one working parameter of the battery set 150 and determine whether the battery set 150 is in a fault state according to the working parameter of the battery set 150. When the battery set 150 is in the fault state, the circuit module 210 is switched from the normal power consumption mode to the low power consumption mode.

Specifically, the circuit module 210 may determine whether the battery set 150 is in the fault state according to the single voltage. The fault state may be an over-charge state, an over-discharge state, or an unbalanced state. The circuit module 210 pre-stores a first voltage and a second voltage, and the first voltage is greater than the second voltage. During charging, the circuit module 210 compares the acquired single voltage with the first voltage. If any one of the single voltages is greater than the first voltage, an over-charge fault occurs in the battery pack. During discharging, the circuit module 210 compares the acquired single voltage with the second voltage. If a single voltage of any one of the battery cores is less than the second voltage, an over-discharge fault occurs in the battery pack. During charging and discharging, the circuit module 210 calculates a maximum voltage value and a minimum voltage value according to the acquired single voltage. If a voltage difference between the maximum voltage value and the minimum voltage value is greater than a first preset difference in the circuit module 210, an unbalanced fault occurs in the battery pack. When the faults occur in the battery pack, the circuit module 210 is switched from the normal power consumption mode to the low power consumption mode.

In any of the embodiments described here, if the charger detects that the charger has a fault, the charger sends a charging state notification instruction carrying fault information of the charger to the first terminal 120 and stops charging the battery pack. After receiving the charging state notification instruction, the circuit module 210 enters the low power consumption mode from the normal power consumption mode.

Still referring to FIG. 6, in any of the embodiments described here, the battery pack further includes the second terminal 160 (in other words, the state indication terminal), connected to the circuit module 210. When the battery pack is connected to the external device, the second terminal 160 is also connected to the external device.

The circuit module 210 may further determine, by detecting a voltage state at the second terminal 160, whether the external device is connected. The voltage state is a size of a voltage at the second terminal 160. When the second terminal 160 is connected to the external device, the external device may provide an external power supply and a pull-up resistor, so that a bias exists at the second terminal 160. When the second terminal 160 is not connected to the external device, the second terminal 160 is suspended. Therefore, the circuit module 210 may determine, by detecting the voltage state at the second terminal 160, whether the external device is connected.

When detecting that the voltage state at the second terminal 160 is greater than or equal to a pre-stored connection recognition preset voltage, the circuit module 210 determines that the battery pack is connected to the external device, and the circuit module 210 does not change a current normal power consumption mode according to a result of the determining. When detecting that the voltage state at the second terminal 160 is less than the connection recognition preset voltage, the circuit module 210 determines that the battery pack is disconnected from the external device. In this case, the circuit module 210 actively enters the low power consumption mode from the normal power consumption mode. In any of the embodiments described here, the circuit module 210 includes the control module 110, the connection recognition preset voltage is stored in the control module 110, and the connection recognition preset voltage may be the same as a recognition preset voltage in the control module 110 or may be different from the recognition preset voltage in the control module 110.

In any of the embodiments described here, when the circuit module 210 determines that the external device is the charger by using the first terminal 120, the battery pack enters a charging state and starts a timer inside the circuit module 210. A first time is preset in the timer. When a time of the timer reaches the preset first time, the circuit module 210 determines that the battery pack has been fully charged by default. In this case, the circuit module 210 enters the low power consumption mode from the normal power consumption mode.

It should be noted that, in any of the embodiments described here, when the battery pack enters the low power consumption mode, a power consumption inside the battery pack is at a microampere level and approaches zero power consumption.

According to the battery pack provided in any of the above embodiments described here, when the charger cannot determine whether the battery pack is fully charged or not, enough charging time can be preset for the battery pack, and when the preset time is reached, the battery pack automatically enters the low power consumption, thereby improving a degree of intelligence of the battery pack.

Based on the foregoing, in any of the above embodiments, six conditions of entering the low power consumption mode are provided: 1. The charger learns that the battery pack is fully charged. 2. The battery pack detects that the battery pack is fully charged. 3. The battery pack detects that the battery pack has a fault. 4. The charger has a fault. 5. The external device is disconnected. 6. The charging reaches a preset time. The battery pack provided in any of the above embodiments described here automatically enters the low power consumption mode when any one of the conditions occurs, which improves the intelligence of the battery pack and reduces the power consumption when the battery pack is not used. A person skilled in the art may understand that the six conditions may be independently applied to one battery pack or may be applied to a battery pack in combination with each other, to form a plurality of different battery packs of any of the embodiments. This combined application is simple and easy to implement, and will not be repeated, and all belong to the protection scope of any of the embodiments of the present invention.

Still referring to FIG. 6, in any of the embodiments described here, the circuit module 210 is connected to the power supply switch 114, and the power supply switch 114 is connected to the battery set 150, so that the battery set 150 supplies power to the circuit module 210 by using the power supply switch. when the circuit module 210 controls the power supply switch 114 to be opened, power supplied to the circuit module 210 is stopped, and the circuit module 210 is switched from the normal power consumption mode to the low power consumption mode.

Figure 7:
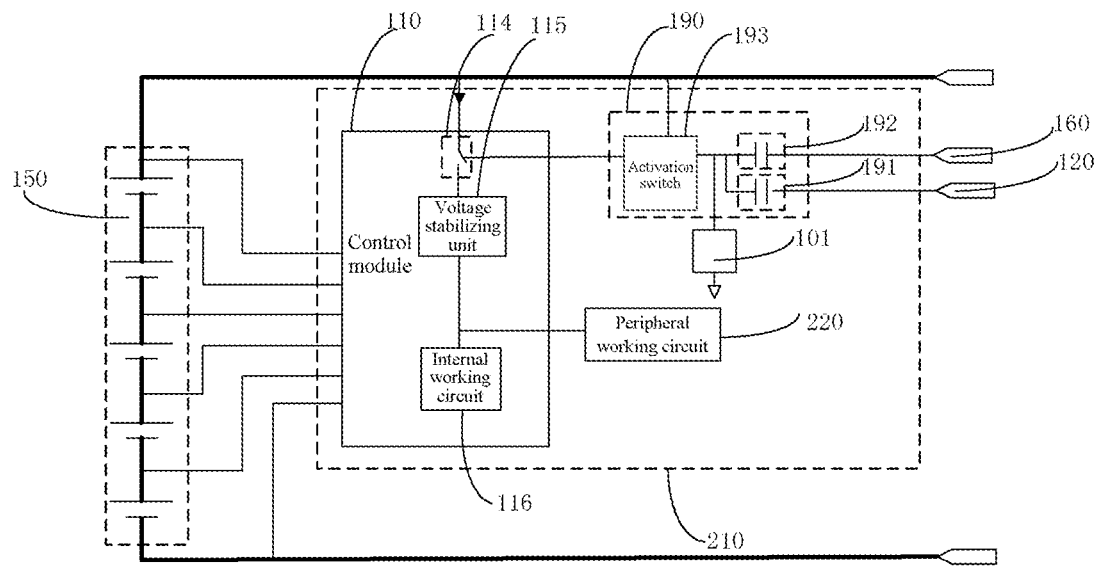
FIG. 7 is a schematic structural diagram of a battery pack according to another embodiment of this application.

Referring to FIG. 7, in any of the embodiments described here, the circuit module 210 includes the control module 110 and the peripheral working circuit 220 connected to the control module 110.

The control module 110 includes the power supply switch 114, the voltage stabilizing unit 115, and an internal working circuit 116. A positive electrode of the battery set 150 is connected to one end of the power supply switch 114, and the other end of the power supply switch 114 is connected to one end of the voltage stabilizing unit 115. The voltage stabilizing unit 115 is configured to convert power of the battery set 150, output working power, and supply power to the internal working circuit 116 and the peripheral working circuit 220. Circuits other than the power supply switch 114 and the voltage stabilizing unit 115 in the control module 110 are all internal working circuits 116. The internal working circuit includes the communication unit 111, performs various functions of the communication, over-charge fault, over-discharge fault, unbalanced fault, power equalization, and the like, and implements determining of the six conditions of entering the low power consumption mode. When the power supply switch 114 is closed, the internal working circuit 116 and the peripheral working circuit 220 supply power for working, and the circuit module 210 is in the normal power consumption mode, in other words, the battery pack is in the normal power consumption mode.

When the power supply switch 114 is opened, an input of the voltage stabilizing unit 115 is cut off and cannot output the working power. In this case, the internal working circuit 116 and the peripheral working circuit 220 are powered off, and the circuit module 210 enters the low power consumption mode from the normal power consumption mode.

In any of the embodiments described here, the control module 110 may be an MCU.

Further, the circuit module 210 further includes the switch activation circuit 190, the battery pack includes at least one terminal, the at least one terminal is connected to the circuit module, and the battery pack is connected to the external device by the at least one terminal. One end of the switch activation circuit 190 is connected to the at least one terminal, and the other end is connected to the power supply switch 114 in the control module 110. The switch activation circuit 190 is configured to control on or off of the power supply switch according to connection or disconnection of the external device. When the battery pack is connected to the external device, the at least one terminal receives an activation signal from the external device and transmits the activation signal to the switch activation circuit, the switch activation circuit controls the power supply switch to be turned on, and the circuit module is switched from the low power consumption mode to the normal power consumption mode. It can be understood that there is the at least one terminal, in other words, there are one or more terminals, and the one or more terminals can respectively obtain activation signals and transmit the activation signals to the switch activation circuit 190, to control the power supply switch 114 to be turned on. In addition, when there are a plurality of terminals, for example, when two different terminals are included, when any one of the terminals obtains the activation signal, the switch activation circuit can receive the activation signal, and the power supply switch 114 is controlled to be turned on. Based on the foregoing, the at least one terminal is a terminal capable of activating a normal power consumption mode.

Further, when the power supply switch 114 is closed, and after the internal working circuit 116 obtains power and starts working, the internal working circuit may send a control signal to the power supply switch 114, to control on or off of the power supply switch. In any of the embodiments described here, when the control signal is a high level, the power supply switch 114 may be controlled to be turned on, and when the control signal is a low level, the power supply switch 114 may be controlled to be opened. When the internal working circuit 116 determines that any one of the six conditions of entering the low power consumption mode is met, the internal working circuit 116 sends a low-level control signal immediately or after delaying of a time period, to control the power supply switch 114 to be opened, and the circuit module is switched to the low power consumption mode.

Further, the switch activation circuit 190 includes a charging unit and an activation switch 193. The activation switch 193 includes a control end, a first end, and a second end. The control end of the activation switch 193 is connected to one end of the charging unit, the other end of the charging unit is connected to the at least one terminal. The first end of the activation switch 193 is connected to a power supply of the battery set, and the second end of activation switch 193 is connected to the power supply switch 114.

The external device has a port adapted to the at least one terminal, and is provided with a pull-up resistor and an external power supply at the port. Therefore, when the external device is connected to the battery pack, a voltage state at the at least one terminal of the battery pack is that a first voltage rises to a second voltage, in other words, the external device inputs an activation signal by using the terminal. The external device may further charge the charging unit by using the at least one terminal. The charging unit may control the activation switch 193 to be turned on, the activation switch 193 controls the power supply switch 114 to be turned on, and the voltage stabilizing unit 115 may receive a source voltage of the battery set 150 and convert the source voltage of the battery set 150 to working power for supplying power to the internal working circuit 116 and the peripheral working circuit 220, so that the circuit module 210 is switched from the low power consumption mode to the normal power consumption mode.

Specifically, when the at least one terminal includes a plurality of terminals, for example, N terminals, one implementation is that the charging unit is one charging unit and is connected to the N terminals simultaneously, and when any one of the terminals has an activation signal, the charging unit is charged. The other implementation is that there are a plurality of charging units (N charging units), a quantity of charging units is the same as a quantity of terminals of the at least one terminal, and each charging unit is connected to one terminal. When one of the terminals has an activation signal, a charging unit corresponding to the terminal is charged.

Specifically, referring to FIG. 7, in any of the embodiments described here, the at least one terminal includes the first terminal 120, in other words, the communication terminal 120, and the charging unit includes a first charging unit. The first terminal 120 is connected to the switch activation circuit 190, and the switch activation circuit 190 may receive an activation signal of the external device from the first terminal 120 and control the power supply switch 114 to be turned on, so that the circuit module 210 is switched from the low power consumption mode to the normal power consumption mode. It may be understood that according to any of the embodiments described here, the communication unit 111 is connected to the first terminal 120, and the communication unit 111 communicates with the external device by using the first terminal 120. In addition, the type recognition element 180 is connected to the first terminal 120, and the external device may detect the type recognition element 180 by using the first terminal 120, to obtain type information of the battery pack. Based on the foregoing, the first terminal 120 has functions of communication and type recognition, as well as a function of activating a normal power consumption mode. Specifically, the activation switch 193 includes a control end, a first end, and a second end. The control end of the activation switch 193 is connected to one end of the first charging unit 191, and the other end of the first charging unit 191 is connected to the state indication terminal 160. The first end of the activation switch 193 is connected to a power supply of the battery set, and the second end of activation switch 193 is connected to the power supply switch 114.

When the external device is the charger or the consumer with a communication function, the charger or the consumer with the communication function has a port adapted to the first terminal 120, and a pull-up resistor and an external power supply are disposed at the port. Therefore, when the external device is connected to the first terminal 120, a voltage state at the first terminal 120 is that the first voltage rises to the second voltage, in other words, the external device inputs the activation signal by using the first terminal 120. Further, the external device may charge the first charging unit 191 by using the first terminal 120. The first charging unit 191 may control the activation switch 193 to be turned on, the activation switch 193 controls the power supply switch 114 to be turned on, and the voltage stabilizing unit 115 may receive a source voltage of the battery set 150 and convert the source voltage of the battery set 150 to working power for supplying power to the internal working circuit 116 and the peripheral working circuit 220, so that the circuit module 210 is switched from the low power consumption mode to the normal power consumption mode.

Further, the at least terminal further includes the second terminal 160, in other words, the state indication terminal 160, and the charging unit includes a second charging unit. When the battery pack is connected to the external device, the battery pack may receive an activation signal of the external device by using the second terminal 160 and transmit the activation signal to the switch activation circuit 190, and the switch activation circuit 190 controls the power supply switch 114 to be turned on according to the activation signal, so that the circuit module 210 is switched from the low power consumption mode to the normal power consumption mode. It may be understood that according to any of the embodiments described here, the circuit module detects at least one working parameter of the battery set and determines whether the battery set is in a fault state according to the working parameter, and when determining that the battery pack is in the fault state, the circuit module controls the second terminal to output an abnormality signal. The working parameter includes any one of a voltage, a temperature, or the like, and the fault state includes any one of an over-charge fault, an over-discharge fault, an over-temperature fault, an unbalanced fault, or the like. In addition, the circuit module internally stores a connection recognition preset voltage, the circuit module detects a voltage state at the second terminal and compares the voltage state with the connection recognition preset voltage, and when the voltage state is greater than or equal to the connection recognition preset voltage, the battery pack is connected to the external device. When the voltage state is less than the connection recognition preset voltage, the battery pack is disconnected from the external device, and the circuit module is switched from the normal power consumption mode to the low power consumption mode, in other words, the first terminal has the functions of communication and type recognition. Based on the foregoing, the second terminal 160 has functions of fault output and recognizing that the external device is disconnected and entering a low power consumption mode, as well as a function of activating the normal power consumption mode.

Specifically, one end of the second charging unit 192 is connected to the second terminal 160, and the other end is connected to the control end of the activation switch 193. Because an external power supply and a pull-up resistor are disposed at a port where the external device is connected to the second terminal 160, when the external device is connected to the second terminal 160, a voltage state at the second terminal 160 is that the first voltage rises to the second voltage, in other words, the external device inputs the activation signal by using the second terminal 160. The external device may charge the second charging unit 192 by using the second terminal 160. The second charging unit 192 may control the activation switch 193 to be turned on, so that the activation switch 190 controls the power supply switch 114 to be closed, and the circuit module 210 may be switched from the low power consumption mode to the normal power consumption mode.

In any of the embodiments described here, the activation switch 193 may be a transistor, the transistor may be an N-type transistor or may be a P-type transistor, and the user may perform selection according to requirements.

In another of the embodiments described here, the at least one terminal of the battery pack includes only the first terminal 120, and the first terminal has the functions of communication and type recognition and is capable of activating the normal power consumption mode. A specific manner is not described again.

In another of the embodiments described here, the at least one terminal of the battery pack includes only the second terminal 160, and the second terminal has the functions of fault output and recognizing that the external device is disconnected and entering a low power consumption mode and is capable of activating the normal power consumption mode. A specific manner is not described again.

In another of the embodiments described here, the at least one terminal of the battery pack includes the first terminal and/or the second terminal, the first terminal is capable of activating the normal power consumption mode and has the functions of communication and/or type recognition, and the second terminal has the functions of fault output and/or recognizing that the external device is disconnected and entering the low power consumption mode in addition to activating the normal power consumption mode.

It may be understood that a person skilled in the art may select any one or more of a function of multiplexing communication, a function of type recognition, a function of fault output, and a function of recognizing that an external device is disconnected and entering a low power consumption mode according to actual design requirements for at least one terminal capable of activating a normal power consumption mode, and a quantity of the at least one terminal may be selected as required, for example, four, and each terminal may respectively multiplex one of the functions Such a combination selection will construct a plurality of different embodiments, which are simple and easy to implement, and are all within the protection scope of any of the embodiments described here of the present invention.

In the foregoing embodiments described here, the first charging unit 191 and the second charging unit 192 are preferably capacitive elements, and due to a charging characteristic of the capacitive element, voltages at the second ends of the first charging unit 191 and the second charging unit 192 change, which is specifically represented as a process of rising and then decreasing. The activation switch 193 has a conduction voltage. In any of the embodiments described here, it is assumed that the conduction voltage is 0.7 V, only when a voltage of the second end of the activation switch 193 is greater than the conduction voltage, the activation switch 193 can be controlled to be turned on, so that the power supply switch 114 is closed, and the battery pack is powered on and enters the normal power consumption mode. Therefore, the activation signal obtained by the switch activation circuit 190 from the first terminal 120 or the second terminal 160 is an instantaneous signal, and a continuous high voltage (in other words, the second voltage in any of the embodiments described here) at the first terminal 120 and the second terminal 160 is not the activation signal, and the activation switch 193 cannot be turned on. When the switch activation circuit 190 obtains the instantaneous activation signal, the activation switch 193 is instantaneously closed, the power supply switch 114 is instantaneously closed, the voltage stabilizing unit 115 outputs working power instantaneously, the internal working circuit 116 is instantaneously powered on for working, the battery pack enters the normal power consumption mode, and the internal working circuit 116 outputs a high level control signal to the power supply switch 114 for maintaining on of the power supply switch while being powered on. In this case, the battery pack implements power-on activation (in other words, activating the normal power consumption mode) and power supply self-locking and is locked in the normal power consumption mode, and the battery pack can start working and work continuously.

In any of the foregoing embodiments described here, the internal working circuit 116 performs a plurality of actions of the circuit module 210 in FIG. 6, for example, learning that the battery pack is fully charged, determining that the battery pack has a fault, learning that the charger has a fault, detecting the second terminal to learn that the battery pack is disconnected from the external device, and performing timing by using a timer during charging, and then the internal working circuit 116 outputs a low-level control signal to the power supply switch 114, to open the power supply switch, so that the battery pack interrupts power supply and performs self-locking and is switched from the normal power consumption mode to the low power consumption mode.

In any of the embodiments described here, the terminal is the first terminal 120 (the communication terminal) and may cause the activation switch 193 to be closed, and the first terminal 120 is connected to the communication unit and/or the type recognition element. A specific connection circuit and a specific control manner are as described above, and details are not described again.

In any of the embodiments described here, the terminal is the second terminal 160 (the state indication terminal) and may cause the activation switch 193 to be closed, and a specific function of the second function is as described above. For example, the circuit module detects at least one working parameter of the battery set and determines whether the battery set is in a fault state according to the working parameter. When determining that the battery pack is in the fault state, the circuit module controls the terminal to output an abnormality signal. The fault state includes the over-charge fault, the over-discharge fault, the unbalanced fault, and another battery fault. For example, the circuit module internally stores a connection recognition preset voltage, the circuit module detects a voltage state at the terminal and compares the voltage state with the connection recognition preset voltage, and when the voltage state is greater than or equal to the connection recognition preset voltage, the battery pack is connected to the external device. When the voltage state is less than the connection recognition preset voltage, the battery pack is disconnected from the external device, and the circuit module is switched from the normal power consumption mode to the low power consumption mode. Another function of the second terminal 160 is not described again in detail.

The battery pack provided in any of the foregoing embodiments described here may be activated by using a first terminal 120 and is switched from a low power consumption mode to a normal power consumption mode, or may be activated by using a second terminal 160 and is switched from a low power consumption mode to a normal power consumption mode. In addition, the second terminal 160 may further output an abnormality signal, a temperature signal, and the like, to improve a degree of integration of a port and reduce a quantity of ports, thereby reducing a volume of the battery pack. In another of the embodiments described here, still referring to FIG. 6, the battery pack further includes a key 101, and the switch activation circuit 190 may be grounded by using the key 101. The switch activation circuit may control on or off of the switch power supply 114 according to closing or opening of the key 101.

The peripheral working circuit 220 further includes a battery level display module, connected to the key 101. When the user presses the key 101, the key 101 is closed, and the switch activation circuit 190 may control the activation switch 193 to be turned on, so that the circuit module 210 enters the normal power consumption mode from the low power consumption mode. In addition, the battery level display module is also activated to display a battery level of the battery set 150. Similarly, the battery pack may implement power-on activation and power supply self-locking by using the key 101. Due to the same principle, specific steps are not repeated again.

According to the battery pack provided in any of the foregoing embodiments described here, when a fault occurs in the battery pack, when the battery pack is fully charged, when a fault occurs in the charger, or when the battery pack is disconnected from the external device, the battery pack may enter a low power consumption mode from a normal power consumption mode, thereby reducing the power consumption of the battery pack. When the battery pack is connected to the external device, the battery pack may automatically enter the normal power consumption mode, to achieve the intelligence of the battery pack.

Figure 8:
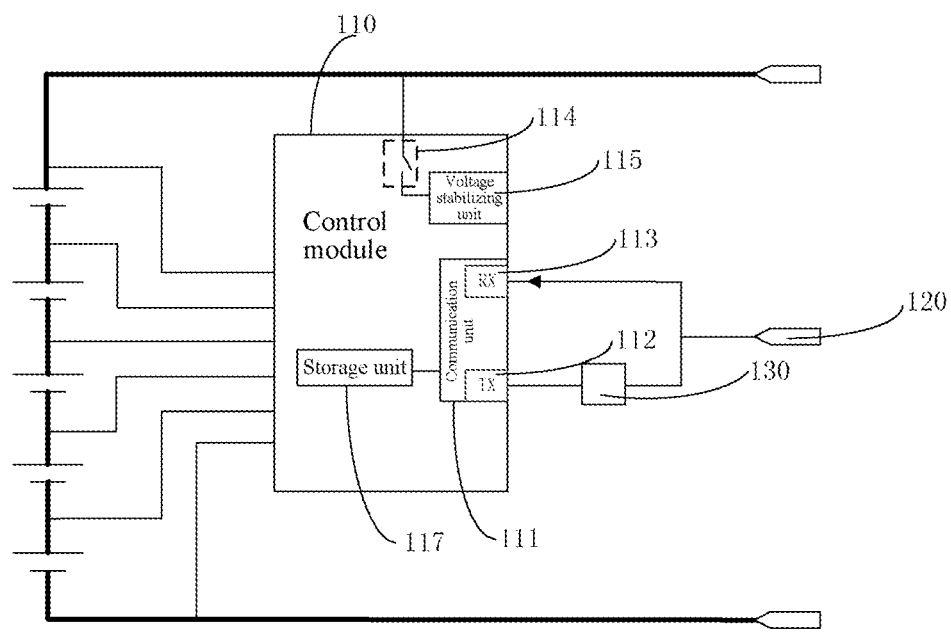
FIG. 8 is a schematic structural diagram of a battery pack according to another embodiment of this application.

Referring to FIG. 8, in any of the embodiments described here, the battery pack further includes a storage unit 117, the storage unit 117 may be disposed in the control module 110 of the battery pack, and the storage unit 117 stores the working parameter of the battery pack, which is specifically a charging parameter and a discharging parameter.

The control module further includes the communication unit 111, connected to the storage unit 117. After the communication unit 111 of the battery pack is connected to the external device by the communication terminal 120 and establishes communication with the external device, the communication unit 111 may send the charging parameter or the discharging parameter to the external device from the communication terminal 120. The external device may control a charging process according to the charging parameter or control a discharging process according to the discharging parameter.

In any of the embodiments described here, the charging parameter includes a maximum allowable charging current. When the battery pack is connected to a charger, the charger may receive the maximum allowable charging current of the battery pack, and set a constant charging current value according to the maximum allowable charging current, to control a constant current charging process. For example, a maximum output charging current of the charger connected to the battery pack is 4 A, a constant charging current is 4 A by default, and the maximum allowable charging current receivable by the battery pack is only 2 A. Consequently, if the charger uses 4 A as the constant charging current value by default, which is obviously inappropriate, the battery pack is damaged immediately. In any of the embodiments described here, the charger learns the maximum allowable charging current of the battery pack, compares the maximum allowable charging current with the maximum output charging current of the charger, to obtain a relatively small value 2 A, and uses the relatively small value as a constant current value for the battery pack in the charging process. In this way, the battery pack can be effectively protected.

In any of the embodiments described here, the charging parameter further includes a maximum allowable charging temperature and a minimum allowable charging temperature. After receiving the maximum allowable charging temperature and the minimum allowable charging temperature, the charger may set a charging over-temperature protection value. After receiving a temperature of the battery pack through communication or receiving a temperature of the battery pack by using the second terminal 160 of the battery pack, the charger compares the received temperature of the battery pack with the charging over-temperature protection value. When the temperature of the battery pack exceeds the charging over-temperature protection value, it indicates that an over-temperature fault occurs in the battery pack. In this case, the charger controls to stop charging.

In any of the embodiments described here, the charging parameter further includes a maximum allowable charging voltage. When the charger is connected to the battery pack, the charger may set a constant charging voltage value according to the maximum allowable charging voltage, to control a constant voltage charging process. In any of the embodiments described here, same as the principle of the maximum allowable charging current, a maximum output charging voltage of the charger does not match the maximum allowable charging voltage of the battery pack, and the maximum output charging voltage is compared with the maximum allowable charging voltage, to obtain a relatively small value as a constant voltage value of the charger for charging the battery pack in a constant voltage manner, so that the battery pack can be effectively protected.

In any of the embodiments described here, the discharging parameter includes a maximum allowable discharging current. When a consumer is connected to the battery pack, the consumer sets an over-current protection value according to the received maximum allowable discharging current. When detecting a discharging current of the battery pack, the consumer compares the discharging current of the battery pack with the over-current protection value, and when the discharging current is greater than the over-current protection value, the consumer controls the battery pack to stop charging.

In any of the embodiments described here, the discharging parameter further includes a maximum allowable discharging temperature and a minimum allowable discharging temperature. After receiving the maximum allowable discharging temperature and the minimum allowable discharging temperature, the consumer may set a discharging over-temperature protection value. After receiving a temperature of the battery pack through communication or receiving a temperature of the battery pack by using the second terminal 160 of the battery pack, the consumer compares the received temperature of the battery pack with the discharging over-temperature protection value. When the temperature of the battery pack exceeds the discharging over-temperature protection value, it indicates that an over-temperature fault occurs in the battery pack. In this case, the consumer controls the battery pack to stop discharging.

In any of the embodiments described here, the discharging parameter further includes a minimum allowable discharging voltage. The consumer may set an over-discharge protection value, in other words, the second voltage, according to the minimum allowable discharging voltage of the battery pack. When obtaining a discharging voltage of the battery pack, the consumer compares the discharging voltage of the battery pack with the over-discharge protection value. When the discharging voltage of the battery pack is less than or equal to the over-discharge protection value, it indicates that an over-discharge fault occurs in the battery pack, and the consumer controls the battery pack to stop discharging.

In the conventional technology, an external device is adaptable to a plurality of types of battery packs simultaneously, and charging conditions and discharging conditions of different types of battery packs have a certain difference, for example, the provided charging parameter and discharging parameter. To implement better charging and discharging control/protection, different types of recognition elements are disposed in the battery pack, and the external device can detect the recognition elements, to recognize different types of battery packs and set different control parameters such as the constant charging value and the discharging over-temperature protection value for the different types of battery packs. However, this manner has limitations. The external device can recognize only several preset recognition elements and is adaptable to only several fixed types of battery packs, and the battery pack can obtain a relatively friendly control when being mounted on only the adapted external device. The battery pack provided in any of the embodiments described here is connected to the external device through communication and can send a preset charging parameter and a preset discharging parameter to the external device by using a communication unit, so that the external device can directly control a charging process or a discharging process according to the charging parameter or the discharging parameter without being limited by a recognition element provided that the external device has a basic communication function. Compared with a case that a battery pack is adaptable to only an external device of a fixed model and the external device is adaptable to only several types of battery packs in the conventional technology, in this application, the battery pack and the external device have a wider adaption range and ensure a good charging and discharging control simultaneously.

Any of the embodiments described here of this application provides a charging system, including a charger and the battery pack. The battery pack is detachably mounted on the charger. The battery pack includes a storage unit 117 and a communication unit 111. The storage unit 117 stores a charging parameter of the battery pack. The communication unit 111 may be connected to the charger by a communication terminal 120 and establish communication with the charger. A specific process of establishing the communication has been described above, and details are not described herein again. The communication unit 111 may send the charging parameter stored in the storage unit 117 to the charger. The charging parameter may include a maximum allowable charging current, a maximum allowable charging temperature, a minimum allowable charging temperature, and maximum allowable charging voltage. Further, the charger may control a charging process of the battery pack according to the received charging parameter. A specific control process has been described above, and details are not described herein again. It may be understood that different battery packs may have different charging parameters, and the charger controls charging of corresponding battery packs according to received different charging parameters.

In the charging system provided in any of the embodiments described here, a battery pack internally pre-stores a charging parameter, and when the battery pack is connected to a charger, the charger may control a charging process of the battery pack according to a received charging parameter, so that one charger can match a plurality of battery packs with different charging parameters, to enlarge an application range of the battery pack.

Any of the embodiments described here of this application provides a discharging system, including a consumer and the battery pack. The battery pack is detachably mounted on the consumer for discharging. The battery pack includes a storage unit 117 and a communication unit 111. The storage unit 117 stores a discharging parameter of the battery pack. The communication unit 117 may be connected to the consumer by a communication terminal 120 and establish communication with the consumer. A specific process of establishing the communication has been described above, and details are not described herein again. The communication unit 111 may send the discharging parameter stored in the storage unit 117 to the consumer. The discharging parameter may include a maximum allowable discharging current, a maximum allowable discharging temperature, a minimum allowable discharging temperature, and a maximum allowable discharging voltage. Further, the consumer may control a discharging process of the battery pack according to the received discharging parameter. A specific control process has been described above, and details are not described herein again. It may be understood that different battery packs may have different discharging parameters, and the consumer controls discharging of corresponding battery packs according to received different discharging parameters.

In the discharging system provided in any of the embodiments described here, a battery pack internally pre-stores a discharging parameter, and when the battery pack is connected to a consumer, the consumer may control a discharging process of the battery pack according to a received discharging parameter, so that one consumer can match a plurality of battery packs with different discharging parameters, to enlarge an application range of the battery pack.

Figure 9:
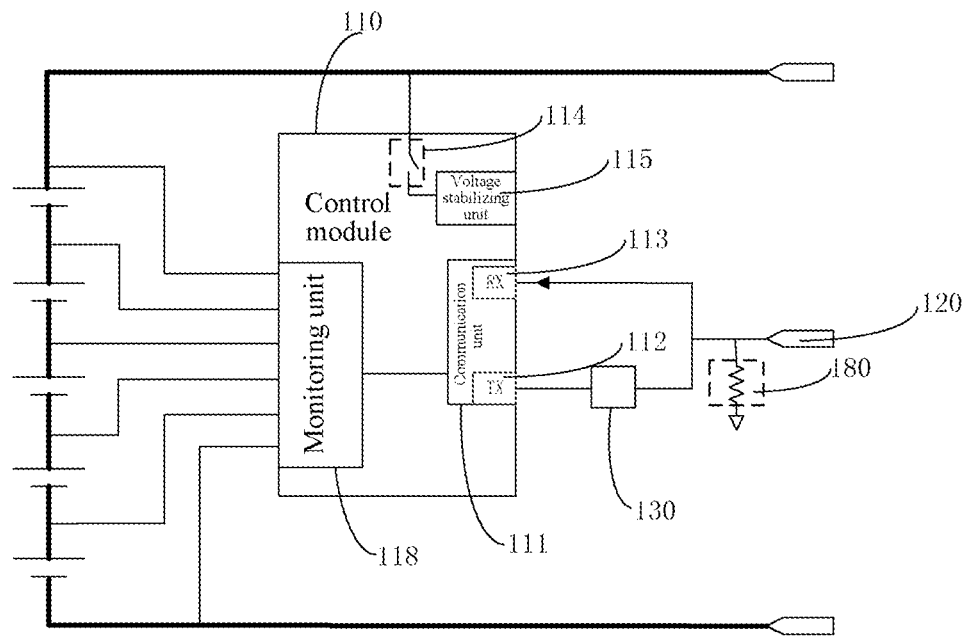
FIG. 9 is a schematic structural diagram of a battery pack according to another embodiment of this application.

In any of the embodiments described here, referring to FIG. 9, the battery pack includes a monitoring unit 118, the communication unit 111, and the communication terminal 120. Both the monitoring unit 118 and the communication unit 111 may be disposed in the control module 110 of the battery pack. The monitoring unit 118 may acquire and obtain a state parameter of the battery pack. The state parameter is a real-time parameter during working of the battery pack, and the state parameter may specifically include any one of a full-pack voltage, a single voltage of a battery core, a battery pack temperature, or a fault state. The communication unit 111 is connected to the monitoring unit 118, and is configured to receive the state parameter acquired by the monitoring unit 118. The communication unit 111 is further connected to the external device by the communication terminal 120, receives a parameter reading instruction sent by the external device by using the communication terminal 120, and transmits the parameter reading instruction to the monitoring unit 118. The communication unit 111 sends the state parameter of the battery pack to the external device according to the parameter reading instruction and by using the communication terminal 120.

The battery pack provided in any of the embodiments described here, only used as a data acquisition end, does not actively transmit data to the outside by using a communication unit and transmits the data to the outside when an external device has a need. First, a line conflict caused by the battery pack and the external device actively sending data simultaneously is avoided, and then the battery pack, as a communication slave, sends information about the battery pack to the outside only when there is a need, to prevent the battery pack from continuously and actively sending the data to the outside to perform a useless operation and waste energy of the battery pack.

In any of the embodiments described here, the battery pack includes a type recognition element 180, and the type recognition element 180 is connected to the communication terminal. When the battery pack is connected to the external device, the external device detects the type recognition element 180 by using the communication terminal, to recognize a type of the battery pack. In any of the embodiments described here, the type recognition element 180 may be a recognition resistor, one end of the recognition resistor is connected to the communication terminal, and the other end is grounded. When the external device is connected to the communication terminal 120, the external device may detect a size of the recognition resistor, and recognition resistors of different sizes correspond to battery packs of different specifications. Therefore, the external device may detect the type of the battery pack by detecting the size of the recognition resistor, to control a charging process or a discharging process.

It is assumed that the battery pack is used as a communication host, the communication unit sends data to the outside continuously by using the communication terminal. A voltage on the communication terminal changes continuously, and the communication terminal can be used for communication alone and has limitations. The battery pack provided by any of the embodiments described here is used as a slave when communicating with an external device, and the communication terminal sends data to the outside only when receiving an instruction of the external device. The communication terminal has continuous voltage fluctuation under impact of communication when transmitting data to the inside or outside within the period of time, and within the remaining times, the communication unit is in a receiving waiting state, the communication terminal has no data transmission, the communication terminal is actually idle, and a voltage state at the communication terminal is stable and unchanged. In any of the embodiments described here, by connecting the type recognition element 180 at the communication terminal 120, the communication terminal 120 may be caused to multiplex a new function, and the external device recognizes the type of the battery pack by detecting the type recognition element at the communication terminal 120. Therefore, within the remaining times, the external device can accurately detect the type recognition element 180 by using the communication terminal 120 to recognize the type of the battery pack without being affected by communication. In this way, when the battery pack is used as the communication slave, the communication terminal can multiplex a plurality of functions, and the battery pack has a small quantity of terminals and a compact structure, and a communication function is preferably configured.

In any of the embodiments described here, after the battery pack is connected to the external device, the communication unit 111 may receive a digital signal of the external device from the communication terminal 120, and transmit the digital signal to the monitoring unit 118. The monitoring unit 118 is configured to detect whether the digital signal is received from the communication unit 111 within a preset time, in other words, detect whether the digital signal sent by the external device is received from the communication terminal 120. In any of the embodiments described here, the digital signal includes a handshake signal, a parameter reading instruction, and the like sent by the external device. When the communication unit 111 detects the digital signal by using the communication terminal 120, the monitoring unit 118 may determine a type of the external device according to the digital signal.

When the communication unit 111 does not detect the digital signal within the preset time, the monitoring unit 118 determines that the external device does not have a communication function. In this case, the monitoring unit 118 detects an analog signal at the communication terminal 120, to determine the type of the external device. When it is determined that the external device is a charger, the battery pack is in a charging state. When it is determined that the external device is a consumer, the battery pack is in a discharging state. In addition, the monitoring unit 118 is disposed in the control module 110, a manner in which the monitoring unit 118 determines the type of the external device according to the digital signal or the analog signal is the same as the manner in which the control module 110 determines the type of the external device according to the digital signal or the analog signal. Details are not described again.

It is assumed that the battery pack is used as a communication host, the communication unit 111 sends data to the outside continuously by using the communication terminal 120. A voltage on the communication terminal 120 changes continuously, and the terminal can be used for communication alone and has limitations. The battery pack provided by any of the embodiments described here is used as a slave when communicating with an external device, and the communication terminal 120 of the battery pack sends data to the outside only when receiving an instruction of the external device. The communication terminal has continuous voltage fluctuation under impact of communication when transmitting data to the inside or outside within the period of time, and within the remaining times, the communication unit 111 is in a receiving waiting state, the communication terminal 120 has no data transmission, the communication terminal 120 is actually idle, and a voltage state at the communication terminal is stable and unchanged. In any of the embodiments described here, the communication terminal 120 multiplexes a new function of recognizing a type of the external device without communication from the communication terminal. Therefore, within the remaining times, the battery pack can accurately recognize the type of the external device without the communication function by using the communication terminal 120 without being affected by communication. In this way, when the battery pack is used as the communication slave, the communication terminal 120 can multiplex a plurality of functions, and the battery pack has a small quantity of terminals and a compact structure, and a communication function is preferably configured.

A specific application scenario 1 of this application is provided below.

Figure 10:
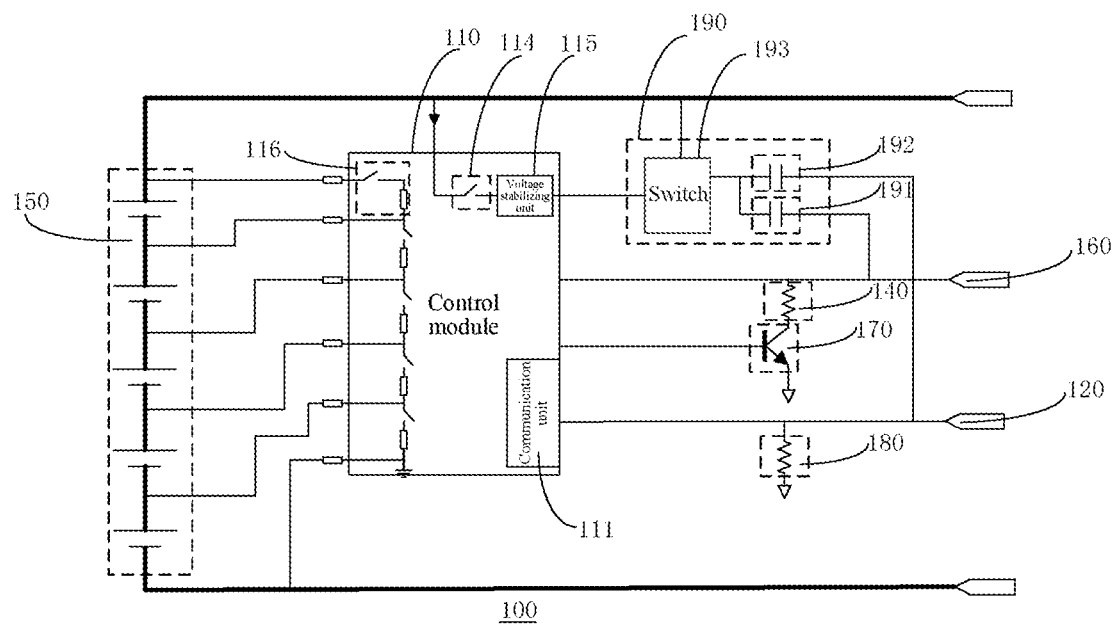
FIG. 10 is a schematic structural diagram of a battery pack according to another embodiment of this application.

Referring to FIG. 10, the embodiments described here of this application provides a battery pack, including a battery set 150 and a control circuit board, where the control circuit board includes a control module 110, a temperature detection module 140, and an interface module. The interface module has four terminals, which are respectively a battery pack power terminal group and a battery pack signal terminal group. The battery pack power terminal group includes a battery pack positive terminal B+ and a battery pack negative terminal B−, and the battery pack signal terminal group includes a communication terminal 120 and a state indication terminal 160. The communication terminal 120 is the first terminal, and the state indication terminal 160 is the second terminal. The communication terminal 120 and the state indication terminal 160 are configured to be connected to an external device, and a type of the external device includes a consumer and a charger. After the battery pack is connected to the external device, the control module 110 is configured to detect whether the communication terminal 120 receives a digital signal of the external device within a preset time. The digital signal may be a handshake signal. When the control module 110 does not receive the digital signal within the preset time, the control module 110 determines that the external device does not have a communication function. In this case, the control module 110 determines the type of the external device by detecting an analog signal at the communication terminal 120. It should be noted that, the charger without the communication function has a port adapted to the communication terminal 120 of the battery pack, and an external power supply and a pull-up resistor are disposed at the port of the charger. When the charger is connected to the battery pack, the battery pack may detect the analog signal by using the communication terminal 120. The consumer without the communication function also has no port adapted to the communication terminal 120 of the battery pack. When the consumer is connected to the battery pack, the communication terminal 120 of the battery pack is suspended. Therefore, the control module 110 may determine the type of the external device by detecting a connection status at the communication terminal 120. If the battery pack detects that a voltage state of the analog signal at the communication terminal 120 is greater than or equal to a preset voltage value, the connection status at the communication terminal 120 is a connected state, and the battery pack may determine that the external device is the charger. If the battery pack detects that the voltage state of the analog signal at the communication terminal 120 is less than the preset voltage value, the connection status at the communication terminal 120 is an unconnected state, and the battery pack may determine that the external device is the consumer.

When the external device is the charger, the control module 110 only determines whether the battery pack is in an over-charge state and does not determine whether the battery pack is in an over-discharge state. A first voltage and a second voltage are preset in the battery pack, and the first voltage is greater than the second voltage. When the external device is the charger, the control module 110 compares an acquired single voltage with the preset first voltage but not with the second voltage. If any single voltage is greater than the first voltage, the battery pack is in the over-charge state and an over-charge fault occurs, and the control module 110 outputs an abnormality signal by using the state indication terminal 160. Even if a single voltage is less than the second voltage, the control module 110 still controls the battery pack to enter a charging state.

When the external device is the consumer, the battery pack enters a discharging state. In this case, the control module 110 only determines whether the battery pack is in the over-discharge state and does not determine whether the battery pack is in the over-charge state. In other words, the control module 110 compares the acquired single voltage with the second voltage but not with the first voltage. If any single voltage is less than the second voltage, the battery pack is in the over-discharge state and an over-discharge fault occurs, and the control module 110 outputs an abnormality signal by using the state indication terminal 160. Even if a single voltage is greater than the first voltage, the control module 110 still controls the battery pack to enter the discharging state.

During charging and discharging, the control module 110 calculates a maximum voltage value and a minimum voltage value according to the acquired single voltage. If a voltage difference between the maximum voltage value and the minimum voltage value is greater than a first preset difference in the control module 110, an unbalanced fault occurs in the battery pack. When the unbalanced fault occurs in the battery pack, the control module 110 similarly outputs an abnormality signal from the state indication terminal 160. When the faults (the over-charge fault, the over-discharge fault, and the unbalanced fault) occur in the battery pack, the battery pack enters a low power consumption mode from a normal power consumption mode.

Specifically, the battery pack further includes a circuit module 210, and the circuit module 210 includes the control module 110 and a peripheral working circuit 220 connected to the control module 110.

The control module 110 includes the power supply switch 114, a voltage stabilizing unit 115, and an internal working circuit 116. Circuits other than the power supply switch 114 and the voltage stabilizing unit 115 in the control module 110 are all internal working circuits 116. A positive electrode of the battery set 150 is connected to one end of the power supply switch 114, and the other end of the power supply switch 114 is connected to one end of the voltage stabilizing unit 115. The voltage stabilizing unit 115 is configured to convert power of the battery set 150, output working power, and supply power to the internal working circuit 116 and the peripheral working circuit 220. When the power supply switch 114 is closed, the internal working circuit 116 and the peripheral working circuit 220 supply power for working, and the circuit module 210 is in the normal power consumption mode, in other words, the battery pack is in the normal power consumption mode.

When the power supply switch 114 is opened, an input of the voltage stabilizing unit 115 is cut off and cannot output the working power. In this case, the internal working circuit 116 and the peripheral working circuit 220 are powered off, and the circuit module 210 enters the low power consumption mode from the normal power consumption mode, in other words, the battery pack enters the low power consumption mode. When the battery pack enters the low power consumption mode, a power consumption inside the battery pack is at a microampere level and approaches zero power consumption.

In any of the embodiments described here, when the control module 110 of the circuit module 210 detects that a voltage state at the state indication terminal 160 is greater than or equal to a connection recognition preset voltage, the battery pack is connected to the external device. When the battery pack is in the normal power consumption mode, the circuit module 210 detects that the voltage state at the state indication terminal 160 is less than the connection recognition preset voltage and determines that the battery pack is disconnected from the external device. In this case, the control module 110 cuts off the power supply switch 114, and the circuit module 210 enters the low power consumption mode from the normal power consumption mode.

In any of the embodiments described here, when the control module 110 of the circuit module 210 determines that the external device is the charger by using the communication terminal 120, the battery pack enters a charging state and starts a timer inside the circuit module 210. A first time is preset in the control module. When a time of the control module reaches the preset first time, the circuit module 210 determines that the battery pack has been fully charged by default. In this case, the circuit module 210 enters the low power consumption mode from the normal power consumption mode.

In any of the embodiments described here, the control module 110 of the circuit module 210 determines that a battery level of the battery pack is full according to a working parameter such as a single voltage/a full-pack voltage, and the circuit module 210 enters the low power consumption mode from the normal power consumption mode.

In any of the embodiments described here, the battery pack further includes a temperature detection module 140, one end of the temperature detection module is connected to the state indication terminal 160, and the other end is connected to a first end of a switch module 170. When the control module 110 detects that a single voltage of any one of the battery cores is greater than an over-discharge voltage or less than an over-charge voltage, the control module 110 controls the switch module 170 to be turned on, so that the external device is connected to the temperature detection module 140 by the state indication terminal 160, to read temperature information of the battery pack.

Specifically, in any of the embodiments described here, the temperature detection module 140 may be a thermistor, and the switch module 170 may be an N-type transistor. One end of the thermistor is connected to a drain of the N-type transistor, a source of the N-type transistor is grounded, and the other end of the thermistor is connected to the state indication terminal 160. When the external device is connected to the battery pack, an external power supply and a pull-up resistor are disposed at a port where the external device is connected to the state indication terminal 160, the external power supply and the pull-up resistor are grounded by using the thermistor and the N-type transistor, and the external device may read the temperature information of the battery pack by reading a resistance value of the thermistor. When determining that over-temperature occurs in the battery pack, the external device is disconnected from the battery pack, so that charging or discharging is stopped for the battery pack.

In another of the embodiments described here, the temperature detection module 140 is further connected to the control module 110, and the control module 110 acquires temperature information of the battery pack and then sends the temperature information of the battery pack to the external device by using the communication unit 111. The external device may determine, according to the received temperature information, whether over-temperature occurs in the battery pack. If the over-temperature occurs in the battery pack, the external device is disconnected from the battery pack, so that charging and discharging are stopped for the battery pack.

When the external device is connected to the battery pack, and the control module 110 of the battery pack detects that the communication unit 111 receives a digital signal within a preset time, the external device has the communication function, and the communication unit 111 may recognize a type of the external device according to the digital signal sent by the external device. The digital signal may be a handshake signal sent by the external device. Handshake signals sent by different external devices are also different. When receiving a first handshake signal, the communication unit 111 may determine, by parsing a source address carried in the first handshake signal, that the charger is externally connected. When receiving a second handshake signal, the communication unit 111 may determine, by parsing a source address carried in the second handshake signal, that the consumer is externally connected. After the communication unit 111 receives the handshake signal and replies with agreement, a handshake is successful, the battery pack enters a charging state or a discharging state, and performs real-time communication with the external device in a charging or discharging process. When the battery pack communicates with the external device, the communication unit 111 may be a serial communication unit, the communication terminal 120 may further be a half-duplex serial port, and the communication unit 111 performs serial communication with the external device by using the communication terminal 120.

Further, the control module 110 further includes a sending interface 112 and a receiving interface 113, and the sending interface 112 and the receiving interface 113 belong to the communication unit 111 and are respectively connected to the communication terminal. The communication unit 111 transmits a to-be-sent signal to the communication terminal from the sending interface 112 and then externally sends the signal to the external device, and the communication unit receives, by using the receiving interface 113, a signal sent by the external device to the communication terminal 120. The battery pack further includes a conversion module 130, one end of the conversion module 130 is connected to the sending interface 112, and the other end is connected to the communication terminal 120. The conversion module 130 is configured to send a signal generated by the communication unit 111 to the external device and prevent a signal of the external device from flowing to the communication unit 111 through the sending interface 112, so that the signal sent by the external device flows to the communication unit only through the communication terminal 120 and the receiving interface 130. In any of the embodiments described here, the conversion module 130 may be a switch controlled by the communication unit 111. In any of the embodiments described here, the communication unit is a serial communication unit, and a serial communication protocol is adopted, the sending interface 112 is a Tx pin, the receiving interface 113 is an Rx pin, and the communication terminal 120 is converted into a half-duplex serial port through the conversion module 130, to send and receive data, but cannot send data simultaneously. The communication unit 111 is in serial communication with the external device through the communication terminal 120.

When the external device is a charger with a communication function, and after a handshake between the charger and the battery pack is successful, the charger sends a parameter reading instruction. After receiving the parameter reading instruction, the battery pack sends a corresponding working parameter and/or a corresponding state parameter to the charger. The working parameter includes a preset charging parameter, and a type of the charging parameter includes preset voltage information, preset current information and preset temperature information. The preset current information may be a maximum allowable charging current, the preset voltage information may be a maximum allowable charging voltage of the battery pack, and the preset temperature information may be a maximum allowable charging temperature and a minimum allowable charging temperature. After receiving the charging parameters, the charger may set a corresponding constant charging current value, a corresponding constant charging voltage value, and a corresponding charging over-temperature protection value according to the charging parameters.

The state parameter is a real-time parameter during working of the battery pack. In any of the embodiments described here, the state parameter includes any one of a full-pack voltage, a single voltage of a battery core, a battery pack temperature, or a fault state. The fault state may be caused by an over-charge fault, an over-discharge fault, an over-temperature fault, an unbalanced fault, or the like. After receiving the full-pack voltage of the battery pack, the charger may determine, according to a preset full charge cutoff voltage, whether the battery pack is fully charged or the battery pack has a fault. If the battery pack is fully charged or the battery pack has a fault, the charger stops charging the battery pack. When the charger learns that the battery pack has been fully charged, the charger sends a charging state notification instruction carrying full charge information of the battery pack and stops charging the battery pack. After receiving the charging state notification instruction, the control module 110 controls the battery pack to enter the low power consumption mode.

If the charger detects that the charger has a fault, the charger sends a charging state notification instruction carrying fault information of the charger and stops charging the battery pack. After the battery pack receives the charging state notification instruction, the power supply switch 114 is controlled to be opened, so that the battery pack enters the low power consumption mode from the normal power consumption mode, to reduce the power consumption when the battery pack is not used.

When the external device is a consumer with the communication function, and after a handshake between the consumer and the battery pack is successful, the consumer sends a parameter reading instruction. After receiving the parameter reading instruction, the battery pack sends a corresponding working parameter and/or a corresponding state parameter to the consumer. The working parameter includes a preset discharging parameter, in other words, preset voltage information, preset current information, and preset temperature information. The preset current information may be a maximum allowable discharging current, the preset voltage information may be a minimum allowable discharging voltage of the battery pack, and the preset temperature information may be a maximum allowable discharging temperature and a minimum allowable discharging temperature. After receiving the discharging parameters, the consumer may set a corresponding over-current protection value, a corresponding over-discharge protection value, and a corresponding discharging over-temperature protection value according to the discharging parameters.

Because the battery pack sends a preset working parameter to the external device through communication, the external device sets a corresponding charging value or a corresponding discharging value according to the received parameter. In this application, the battery pack has a wider adaption range than that of a case that the charger can charge only a specific battery pack or the battery pack can charge only a consumer of a specific model in the conventional technology.

When the battery pack establishes communication with the external device, the battery pack, as a slave, receives data, the external device, as a host, sends data, and the battery pack sends data to the outside only after receiving an instruction of the external device, to avoid a line conflict caused by the battery pack and the external device actively sending data simultaneously, and also prevent the battery pack from continuously sending data to the outside to perform a useless operation and waste energy of the battery pack.

In any of the embodiments described here, the battery pack 100 includes a switch activation circuit 190, one end of the switch activation circuit 190 is connected to the communication terminal 120 and the state indication terminal 160, and the other end is connected to the control module 110. When the external device is connected to the battery pack, the control module 110 receives, by using the switch activation circuit 190, an activation signal sent by the external device, and the battery pack is switched from the low power consumption mode to the normal power consumption mode.

In any of the embodiments described here, when the battery pack is not connected to the external device, the battery pack is in the low power consumption mode, and the internal working circuit does not work. When the battery pack is connected to the external device, the battery pack may be switched from the low power consumption mode to the normal power consumption mode after detecting the external device.

Specifically, the switch activation circuit 190 includes a first charging unit 191 and an activation switch 193. The activation switch 193 includes a control end, a first end, and a second end. The control end of the activation switch 193 is connected to one end of the first charging unit 191, and the other end of the first charging unit 191 is connected to the state indication terminal 160. The first end of the activation switch 193 is connected to a power supply, and the second end of the activation switch 193 is connected to the control module 110.

When the external device is connected to the battery pack, the external device is connected to the state indication terminal 160. Because an external power supply and a pull-up resistor are disposed at a port where the external device is connected to the state indication terminal 160 the external device may charge the first charging unit 191 by using the state indication terminal 160. The first charging unit 191 may control the activation switch 193 to be turned on, the control module 110 may detect the power supply connected to the activation switch 193 and the control module 110 is switched from the low power consumption mode to the normal power consumption mode.

Further, in another of the embodiments described here, the switch activation circuit 190 may further include a second charging unit 192, one end of the second charging unit 192 is connected to the communication terminal 120, and the other end is connected to the control end of the activation switch 193. When the external device is connected to the communication terminal 120, the external device has a port adapted to the communication terminal 120, and a pull-up resistor and an external power supply are disposed at the port. Therefore, the external device may charge the second charging unit 192 by using the communication terminal 120. The second charging unit 192 may control the activation switch 193 to be turned on, so that the control module 110 detects a working power supply connected to the activation switch 193, and the control module may be switched from the low power consumption mode to the normal power consumption mode.

In any of the embodiments described here, the activation switch 193 may be a transistor, the transistor may be an N-type transistor or may be a P-type transistor, and the user may perform selection according to requirements.

According to the battery pack provided in any of the embodiments described here, by using a state indication terminal, a fault signal of the battery pack and temperature information of the battery pack are outputted, the battery pack is activated to be powered and work, and disconnection between the battery pack and an external device is detected and the battery pack enters a low consumption for power saving; and by using a communication terminal, types of external devices on different platforms are recognized, the battery pack communicates with the external device with a communication function, the battery pack is activated to be powered on and work, and the external device recognizes a type of the battery pack, so that a plurality of functions are multiplexed by using one port, to reduce a quantity of ports of the battery pack, thereby improving a degree of integration of the port. The battery pack may be not only used for an external device with a communication function but also used for an external device without the communication function, and has a wide applicable platform. In addition, when a fault occurs in the battery pack, when the battery pack is fully charged, when a fault occurs in the charger, or when the battery pack is disconnected from the external device, the battery pack may enter a low power consumption mode from a normal power consumption mode, thereby reducing a power consumption of the battery pack. When the battery pack is connected to the external device, the battery pack may automatically enter the normal power consumption mode, to achieve the intelligence of the battery pack.

The technical features in any of the foregoing embodiments described here may be randomly combined. For concise description, not all possible combinations of the technical features in any of the embodiments are described. However, as long as combinations of the technical features do not conflict with each other, the combinations of the technical features are considered as falling within the scope described in this specification.

Any of the foregoing embodiments described here only describe several implementations of the present disclosure, and their description is specific and detailed, but cannot therefore be understood as a limitation to the patent scope of the embodiments described here of the present invention. It should be noted that, a person of ordinary skill in the art may further make some variations and improvements without departing from the concept of the embodiments of the present invention, and the variations and improvements belong to the protection scope of the embodiments of the present invention. Therefore, the protection scope of the patent of the embodiments of the present invention shall be topic to the claims.

referring to FIG. 4, in any of the embodiments described here, the battery pack is detachably connected to an external device for charging or discharging. The external device includes a consumer and a charger, and the battery pack includes a battery set, a control module 110, a first signal terminal 120, and a second signal terminal 160. The first signal terminal 120 and the second signal terminal 160 are connected to the control module and are connected to the external device, and the control module detects at least one operating parameter of the battery set, and generates a state parameter related to the operating parameter according to the operating parameter, the control module sends the state parameter to the outside by using the first signal terminal 120, and the control module sends the state parameter to the outside by using the second signal terminal 160.

The operating parameter is a physical quantity obtained by detecting elements such as a resistor, a sensor, and a battery, without being processed, reflecting a real-time state of the battery, and including a full-pack voltage, a single voltage of a battery core, a battery pack temperature, a current, and the like. For example, the resistor is a resistor for detecting a temperature, and a voltage value obtained by detecting the resistor is an operating parameter reflecting a real-time temperature. For example, one battery core can reflect a single voltage, and a voltage value obtained by detecting two ends of the battery is an operating parameter reflecting a real-time single voltage.

After such an operating parameter is processed, a state parameter related to the operating parameter may be obtained. First processing manner: calculation and package. For example, a digital signal of 35° C. is obtained after an operating parameter A (eg: 2 V) of a temperature is calculated and packaged, and the digital signal is stored in a binary way. In this case, the digital signal 35 is a state parameter A' and similarly reflects a real-time state of a battery. In the first processing manner, the state parameter is an operating state signal representing an operating parameter of an operating state of the battery set and similarly including a full-pack voltage, a single voltage of a battery core, a battery pack temperature, a current, and the like. Second processing manner: comparison and conversion. For example, an operating parameter A (eg: 5 V) of a temperature is compared with a preset value 3.5 V of 50° C., the operating parameter exceeds the preset value, and it is determined that over-temperature occurs in the battery pack and the battery pack is in a fault state. In this case, an abnormality signal representing that the battery pack is in the fault state is generated. Alternatively, a digital signal of 60° C. obtained by processing A (eg: 5 V) in the first processing manner is compared with a preset value 50, the digital signal of 60° C. exceeds the preset value, and it is determined that over-temperature occurs in the battery pack and the battery pack is in the fault state. Similarly, an abnormality signal representing that the battery pack is in the fault state is generated, and the abnormality signal may be one bit of binary 1 or 0 of the digital signal or may be a high level or a low level of an analog signal. The fault state includes any one of an over-charge state, an over-discharge state, an over-temperature state, an unbalanced state, or an over-current state, which are all determined according to the operating parameter. In the second processing manner, the state parameter is an abnormality signal representing that the battery set is in the fault state and reflects whether any fault occurs.

In this case, the battery pack outputs an independent state parameter from two paths of communication channels of a first signal terminal and a second signal terminal, notifies an external device of a state of the battery pack, and outputs the state parameter in a dual-backup manner, and when a communication fault occurs in one communication channel, the other communication channel ensures the output of the state parameter, so that the external device can determine the state of the battery pack in time according to the state parameter, to cut off charging or discharging, thereby protecting the battery pack and improving security.

In any of the embodiments described here, the control module includes a communication unit, and the control module sends a state parameter of a digital signal to the first signal terminal by using the communication unit and sends a state parameter of an analog signal to the outside by using the second signal terminal. The state parameter is an abnormality signal representing that the battery set is in a fault state, and when receiving any one of the abnormality signals sent by the first signal terminal and the second signal terminal, the external device stops charging or discharging. In this case, when it is determined that any fault related to a temperature, a battery voltage, and a current occurs in the battery pack during operation, the battery pack outputs two independent abnormality signals from two paths of communication channels of the first signal terminal and the second signal terminal, and notifies the external device that a fault has occurred in the battery pack. When a communication fault occurs in one communication channel, the other communication channel ensures the output of the abnormality signal. Abnormality is outputted in a dual-backup manner, so that the external device can cut off charging or discharging in time, thereby protecting the battery pack and improving security.

Further, the fault state includes any one of an over-charge state, an over-discharge state, an over-temperature state, an unbalanced state, or an over-current state.

Further, referring to a description of any of the embodiments described here corresponding to FIG. 4, the control module includes the communication unit, the communication unit is a serial communication unit, the communication unit includes a sending interface and a receiving interface, and the sending interface and the receiving interface are respectively connected to the first terminal; when the communication unit sends a digital signal at a first moment, the digital signal is sent to the first signal terminal from the sending interface; when the communication unit receives a digital signal at a second moment, the digital signal is sent to the receiving interface from the first signal terminal; and the first moment is different from the second moment. Therefore, the first signal terminal is a half-duplex serial port, which can both send and receive data, but cannot send and receive the data simultaneously and can only send or receive the data in a time-sharing manner. The serial communication unit has a clock circuit and can ensure that the digital signal is outputted in sequence on the first signal terminal. Compared with a case that I2C communication requires matching between two lines of a data line and a clock line to output data, the implementation of any of the embodiments described here has a simple circuit, a high degree of integration, few interfaces, and a corresponding reduction in costs.

Further, the control module includes a storage unit, connected to the communication unit, the storage unit stores an abnormality signal of the fault state, the step of sending, by the first signal terminal, a state parameter of a digital signal to the outside includes: detecting, by the control module, the digital signal received by the first signal terminal, and reading, by the communication unit, the abnormality signal stored in the storage unit when the received digital signal is a parameter reading instruction, and controlling the first signal terminal to output the abnormality signal of the digital signal. When the control module is a microprocessor, the storage unit is a volatile storage unit inside the microprocessor, when the microprocessor is powered off, stored content is lost, and the storage unit provides short-term data storage for communication of the battery pack as a slave.

Further, the control module detects the digital signal received by the first signal terminal and determines whether the battery pack is in a digital communication fault state according to the received result, if the battery pack is in the digital communication fault state, the control module controls the second signal terminal to output an abnormality signal of an analog signal, and when receiving the abnormality signal, the external device stops charging or discharging. There are a plurality of reasons resulting in a digital communication fault. In a first case, a program in the battery pack or the external device runs away or a hardware circuit has a fault. Consequently, the first signal terminal of the battery pack sends garbled characters to the outside or a corresponding communication unit in the external device sends garbled characters to the first signal terminal of the battery pack, or the battery pack and a communication unit of the external device cannot send or receive a digital signal normally. In a second case, a communication line formed by the first signal terminal of the battery pack and a third signal terminal (not shown in the figure) electrically/mechanically connected to the charger and corresponding to the first signal terminal is broken, which may be poor contact of pole pieces or damage of wires or components. Consequently, the battery pack and the communication unit of the external device cannot send or receive the digital signal normally. In this case, the battery pack, the communication unit of the external device, and the program run normally. It should be noted that there are other complex reasons for the communication fault of the first signal terminal. Details are not described herein again. A person skilled in the art easily understands that during serial communication, one of the battery pack or the external device is a host for serial communication, and the other is a slave. It is a complete data exchange process that the host sends a request instruction and the slave replies with a response instruction after receiving the request instruction. Therefore, for a battery pack, the step of determining whether the battery pack is in a communication fault state according to the received result includes the following two manners:

(1) The control module sends a preset request instruction, determines, when the control module receives a digital signal, whether the digital signal is a response instruction corresponding to the preset request instruction, and determines that the battery pack is in the digital communication fault state if the digital signal is not the response instruction corresponding to the preset request instruction. In a case that the digital signal is not the response instruction corresponding to the preset request instruction, the control module considers the digital signal as garbled characters. When the battery pack is a host and the external device is a slave, the battery pack sends a request instruction such as a handshake instruction with an instruction bit 0*01, which represents an instruction that a communication handshake is required, to the outside by using the first signal terminal, and the external device replies with a response instruction with a similar instruction bit of 0*01 in a normal case The battery pack recognizes that the instruction bit of the response instruction corresponds to the instruction bit of the request instruction, it is determined that communication is normal, and if the battery pack recognizes that the instruction bit of the response instruction is not 0*01, it is determined that the battery pack is in the digital communication fault state.

(2) It is determined that the battery pack is in the digital communication fault state when the control module does not receive the digital signal and a preset time is reached. When the battery pack is a host and the external device is a slave, the battery pack sends a request command to the outside by using the first signal terminal, and in a case that serial communication is normal, a corresponding communication unit of the external device rapidly replies with a response instruction. However, when the program in the external device runs away or the hardware circuit has the fault, or the communication line is broken, the communication unit of the battery pack receives no digital signal beyond a preset time, in other words, a digital communication fault occurs. When the battery pack is the slave and the external device is the host, the battery pack and the external device have been mounted normally, the control module in the battery pack is just powered on for working and waits for a handshake signal of the external device to establish first communication, and in a normal case, after being started, the external device rapidly and actively sends the handshake signal. However, when the program in the charger runs away or the hardware circuit has the fault, or the communication line is broken, the communication unit of the battery pack receives no digital signal beyond a preset time, in other words, the digital communication fault occurs. It should be noted that the above case is not limited thereto and is readily figured out by a person skilled in the art, which is not listed herein one by one.

Further, the control module internally stores a connection recognition preset voltage, and the control module detects a voltage state at the second signal terminal, compares the voltage state with the connection recognition preset voltage, and determines that the battery pack is connected to the external device when the voltage state is greater than or equal to the connection recognition preset voltage; and when the voltage state is less than the connection recognition preset voltage, it is determined whether the battery pack is in an analog communication fault state, and the control module controls the first terminal to output an abnormality signal of a digital signal, and when receiving the abnormality signal, the external device stops charging or discharging. The reason for the analog communication fault may be that a communication line formed by the second signal terminal of the battery pack and a fourth signal terminal (not shown) electrically/mechanically connected to the external device and corresponding to the second signal terminal is broken, for example, poor contact of pole pieces of the terminal or damage of wires or components. Consequently, the battery pack and a control unit of the external device cannot detect a high/low level on the second signal terminal.

In the implementation of any of the embodiments described here, the first signal terminal and the second signal terminal are two communication channels. When a communication fault occurs in any one of the communication channels, the other communication channel can reflect the communication fault, which is different from the fault state such as over-charge, over-discharge, unbalanced, and over-temperature of the operating parameter during operation of the battery. The communication fault cannot be reflected by the operating parameter, but the communication fault is similarly an abnormal fault of the entire battery pack, which makes it unsafe to use. The battery pack is further protected in the manners to improve security.

Further, in any of the embodiments described here, the battery pack further includes a switch module 170, the switch module includes a control end, a first end, and a second end, the control end of the switch module is connected to the control module, the first end of the switch module is connected to the second signal terminal, and the second end of the switch module is grounded; and the control module controls, by using the control end, the switch module to be opened or closed, when the switch module is opened, the second signal terminal is disconnected from the ground, and the external device detects that the second signal terminal is suspended, so that the second signal terminal outputs an abnormality signal of the analog signal. For a specific implementation and an effect of the manner, reference is made to the corresponding description in FIG. 4, and details are not described again.

Further, in any of the embodiments described here, the battery pack further includes a temperature detection module 140, configured to detect a temperature of the battery pack, where one end of the temperature detection module is connected to the second signal terminal, and the other end is connected to the first end of the switch module; and when the switch module is closed, the second signal terminal is grounded by using the temperature detection module, and the external device detects the temperature detection module by using the second signal terminal, to obtain the temperature of the battery pack, so that the second signal terminal outputs the temperature of the battery pack. For a specific implementation and an effect of the manner, reference is made to the corresponding description in FIG. 4, and details are not described again.

Further, in any of the embodiments described here, the battery pack includes a type recognition element 180, connected to the first signal terminal, where when the battery pack is connected to the external device, the external device can detect the type recognition element by using the first signal terminal to obtain type information of the battery pack. For a specific implementation and an effect of the manner, reference is made to the corresponding description in FIG. 9, and details are not described again.

Further, in any of the embodiments described here, a nominal voltage of the battery set is greater than or equal to 18 V.

Further, in any of the embodiments described here, a nominal voltage of the battery set is greater than 54 V. A high-voltage battery pack has a particularly high requirement for the safety use of a battery pack, and all the outputting abnormality through dual-channel, the digital communication fault protection, and the analog communication fault protection improve safety performance of the battery pack.

Further, in any of the embodiments described here, a nominal voltage of the battery set is about 72 V. A high-voltage battery pack has a particularly high requirement for the safety use of a battery pack, and all the outputting abnormality through dual-channel, the digital communication fault protection, and the analog communication fault protection improve safety performance of the battery pack.

In any of the embodiments described here, for example, in the battery pack, the control module includes a communication unit, and the control module sends a state parameter of a digital signal to both the first signal terminal and the second signal terminal through the communication unit. The state parameter is a state signal representing an operating parameter of an operating state of the battery set. When receiving any one of the state parameters sent by the first signal terminal and the second signal terminal, the external device determines, according to the state parameter, whether a fault such as over-charge, over-discharge, over-temperature, or unbalanced occurs, and stops charging or discharging if the fault occurs. In the manner, the battery pack outputs an independent state parameter from two paths of communication channels of a first signal terminal and a second signal terminal, notifies the external device of a state of the battery pack, and outputs the state parameter in a dual-backup manner. When a communication fault occurs in one communication channel, the other communication channel ensures the output of the state parameter, so that the external device can determine the state of the battery pack in time according to the state parameter, to cut off charging or discharging, thereby protecting the battery pack and improving security.

In any of the embodiments described here, for example, in the battery pack, the control module includes a communication unit, and the control module sends a state parameter of a digital signal to the first signal terminal by using the communication unit. The state parameter of the digital signal is a state signal representing an operating parameter of an operating state of the battery set. The control module sends a state parameter of an analog signal to the outside by using the second signal terminal, and the state parameter of the analog signal is an abnormality signal representing that the battery set is in a fault state. After receiving the state signal representing the operating parameter of the operating state of the battery set from the first signal terminal, the external device determines, according to the state parameter, whether a fault such as over-charge, over-discharge, over-temperature, or unbalanced occurs, and stops charging or discharging if the fault occurs. In addition, when receiving the abnormality signal representing that the battery set is in the fault state from the second signal terminal, the external device stops charging immediately. In this case, the battery pack performs once fault determining and directly notifies the external device of the fault. In addition, the battery pack transmits a state signal to the external device, and the external device also performs once fault determining. In this way, signals are outputted through dual-communication channels, first, any one path of the communication channels has a fault, and the other path of communication channel ensures output of data, to ensure dual communication, thereby improving security. In addition, both internal and external faults are determined, to achieve dual-fault diagnosis, thereby improving the security.

It should be noted that the battery pack with the communication unit provided in any one of the foregoing embodiments may be not only used for an external device without a communication function, but also used for an external device with the communication function, and has wide universality and high compatibility. For example, a 60 V communication battery pack may be mounted on a communication charger and a non-communication charger for charging and may be mounted on a communication tool and a non-communication tool for discharging. A specific manner of resolving a compatibility problem is described in the corresponding embodiments described here in FIG. 1 and FIG. 2. Details are not described again.

Another specific application scenario 2 of this application is provided below.

Figure 11:
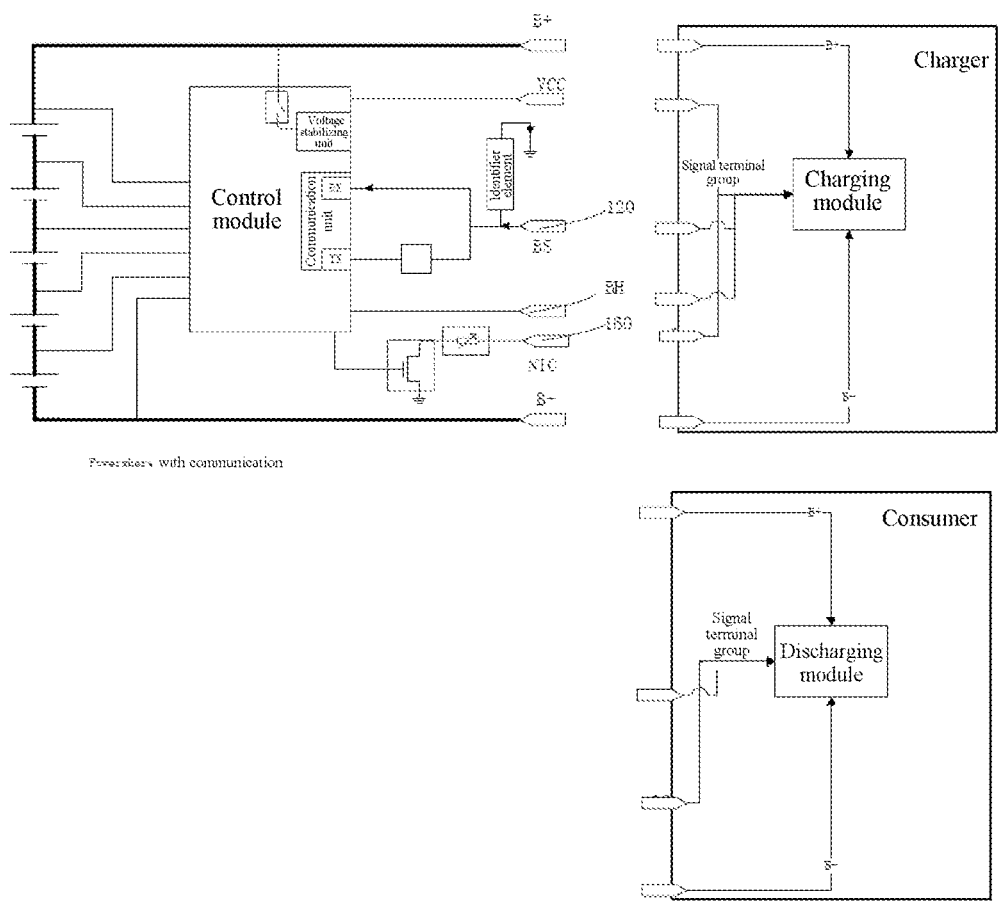
FIG. 11 is a schematic structural diagram of a battery pack and a diagram of matching between a battery pack and a tool as well as a charger according to another embodiment of this application.

Referring to FIG. 11, another of the embodiments described here of this application provides a battery pack, including a battery set 150 and a control circuit board. The control circuit board includes a control module 110, a temperature detection module 140, a type recognition element 180, a peripheral working circuit 220, and a switch activation circuit 190, and the control module 110 includes a monitoring unit 118, a communication unit 111, a power supply switch 114, and a voltage stabilizing unit 115. The circuits and functions of the composition modules are basically described in the above embodiments, and are not repeated. If there are subtle differences, the differences will be described in detail in the following section. Further, the battery pack further includes an interface module. A consumer is described in detail by using an electric tool as an example.

A difference between this embodiment and any of the embodiments described here of the application scenario 1 is that: the interface module in any of the embodiments described here has six terminals, which are respectively a battery pack power terminal group and a battery pack signal terminal group. The battery pack power terminal group includes a battery pack positive terminal B+ and a battery pack negative terminal B−, and the battery pack signal terminal group includes a communication terminal, a power input terminal VCC, a charging state indication terminal BH, and a battery pack temperature recognition terminal T. The battery pack can also be connected to an external device with communication and an external device without communication compatibly. When the battery pack is connected to an electric tool with communication and an electric tool without communication, the BH terminal and the VCC terminal are in no mechanical/electrical connection with a signal terminal group of the electric tool, and when the battery pack is connected to a charger with communication and a charger without communication, all the six terminals are mechanically/electrically connected to a signal terminal group of the charger, in other words, the signal terminal group of the charger also has six terminals.

It can be learned from the above that the VCC terminal and the BH terminal are dedicated to the signal terminals of the charger. When the VCC terminal is configured to obtain a pull-up resistance 5 V from the charger, the BH terminal is enabled in this case. When the control module determines that single over-charge occurs, an analog high-level abnormality signal is outputted from the BH terminal, where the abnormality signal represents that the battery pack is in a fault state, otherwise, an analog low-level signal is outputted from the BH terminal, where the analog low-level signal represents that the battery pack is normal.

In any of the embodiments described here, (1) same as any of the foregoing embodiments, the battery pack temperature recognition terminal T (which is referred to as a T terminal for short) is a multiplexing terminal for outputting a fault signal and a temperature, and a circuit connection manner and a signal output manner may correspond to that of the state indication terminal 160 in any of the foregoing embodiments for connecting the switch module 170 and the temperature detection module 140. Details are not described again. A difference from any of the foregoing embodiments lies in that: only when the control module determines that a single over-discharge fault occurs, the control module controls the T terminal to output a fault signal, and when the remaining faults such as over-temperature and unbalanced occur, no abnormality is outputted. (2) The T terminal also has a function of activating the battery pack to enter a normal power consumption work, which is the same as that in any of the foregoing embodiments, and the T terminal is connected to the switch activation circuit. A specific circuit and a connection manner are as described above and are not repeated again. (3) The T terminal also has a function of recognizing whether an external device is connected, which is the same as the state indication terminal 160 in any of the foregoing embodiments, and uses the same manner of storing a connection recognition preset voltage. Details are not described again. (4) The T terminal also has a function of causing the battery pack to enter a low power consumption mode, in other words, the T terminal determines, by using the connection recognition preset voltage, whether the external device is connected, and causes the battery pack to enter the low power consumption mode if the external device is not connected.

In any of the embodiments described here, for the BS terminal: (1) the BS terminal, the same as the communication terminal 120 in any of the foregoing embodiments, has a multiplexing function of serial communication and recognizing a type of the battery pack. For specific content, refer to any of the foregoing embodiments, which is not repeated again; and (2) when the BS terminal is connected to a communication external device, the control module detects a digital signal at the BS terminal and determines that a type of the external device is either an electric tool or a charger according to the digital signal, and the method is the same as that in any of the foregoing embodiments. A difference from any of the foregoing embodiments lies in that the control module in any of the embodiments described here no longer has a working status recognition interface 119 connected to the BS terminal, and no longer monitors an analog signal at the BS terminal, and therefore no longer determines that a non-communication external device is either an electric tool or a charger. This function is implemented by the VCC terminal in any of the embodiments described here. When it is recognized that a voltage of the VCC terminal is greater than a preset value, the charger is connected, otherwise, the electric tool is connected.

Therefore, as can be learned from the above, according to the battery pack of any of the embodiments described here, a method for recognizing a working status of a battery pack is provided, a working status includes a charging state and a discharging state, and steps include: detecting whether the BS terminal of the battery pack receives a digital signal of an external device; determining a type of the external device according to the digital signal if the BS terminal of the battery pack receives the digital signal of the external device; and detecting an analog signal at the VCC terminal of the battery pack if the BS terminal of the battery pack does not receive the digital signal of the external device, and determining the type of the external device according to the analog signal.

Further, when the working status of the battery pack can be recognized, in any of the embodiments described here, there is also a function of shielding over-discharge determining in the charging state and shielding over-charge determining in the discharging state. A difference from any of the foregoing embodiments lies in that abnormality signals of over-charge and over-discharge are outputted from the same terminal 160 in any of the foregoing embodiments, but in any of the embodiments described here, an over-discharge abnormality signal is outputted from the T terminal, and an over-charge abnormality signal is outputted from the BH terminal.

In any of the embodiments described here, an implementation in which the battery pack enters a low power consumption mode is the same as that in any of the foregoing embodiments. Details are not described again.

In any of the embodiments described here, a difference between an implementation in which the battery pack is activated and exit the low power consumption mode in any of the embodiments described here and that in any of the foregoing embodiments lies in that there is only T terminal and no BS (120) terminal in any of the embodiments described here, in other words, the switch activation circuit is connected to only the T terminal and is disconnected from the BS terminal.

In any of the embodiments described here, the battery pack is used as a slave and the external device is used as a host, a communication manner is the same as that in any of the foregoing embodiments, including a function of passively sending a state parameter and a function of transmitting a charging/discharging working parameter to the external device for use during serial communication. Details are not described herein again.

In any of the embodiments described here, when the battery pack is connected to the charger with communication, serial communication of the BS terminal and output of an abnormality signal of an analog signal at the BH terminal form dual-communication channels. When the battery pack is connected to an electric tool with communication, serial communication of the BS terminal and output of an abnormality signal of an analog signal at the T terminal form dual-communication channels. When any one of the communication channels has a fault, the other communication channel ensures output of the battery pack in an over-charge/over-discharge state, achieving double protection, thereby improving the safety use of the battery pack. Other details are the same as any of the foregoing embodiments, which are not repeated again.

The other details of any of the embodiments described here are the same as the implementations of any of the foregoing embodiments, which are not repeated again.

What is claimed is:

1. A battery pack comprising:
    a plurality of battery cores connected in series;
    a control module; and
    a communication terminal,
    wherein:
        the control module is connected to the communication terminal, the communication terminal is configured to be connectable to an external device, and a type of the external device includes a consumer and a charger;
        when the battery pack is connected to the external device, the control module is configured to detect whether a digital signal of the external device is received from the communication terminal within a preset time;
        the control module determines the type of the external device according to the digital signal if the digital signal of the external device is received from the communication terminal; the control module detects an analog signal of the communication terminal if the digital signal of the external device is not received from the communication terminal, and determines the type of the external device according to the analog signal;

when it is determined that the external device is the charger, the battery pack is controlled in a charging state; and when it is determined that the external device is the consumer, the battery pack is controlled in a discharging state.

2. The battery pack according to claim 1, wherein: the control module includes a communication unit and a working status recognition interface, and the communication unit includes a sending interface and a receiving interface;

and the sending interface, the receiving interface, and the working status recognition interface are respectively connected to the communication terminal, the control module detects, by using the receiving interface, whether the digital signal of the external device is received from the communication terminal, and the control module detects the analog signal at the communication terminal by using the working status recognition interface.

3. The battery pack according to claim 2, wherein the communication unit is a serial communication unit, the communication terminal is a half-duplex serial interface, and the communication unit performs serial communication with the external device through the communication terminal, to receive the digital signal.

4. The battery pack according to claim 1, wherein: the digital signal includes a first handshake signal and a second handshake signal;

when the digital signal received by the control module is the first handshake signal, it is determined that the type of the external device is the charger;

and when the digital signal received by the control module is the second handshake signal, it is determined that the type of the external device is the consumer.

5. The battery pack according to claim 1, wherein: the control module internally stores a preset value, when the control module determines that a voltage state value of the analog signal is greater than or equal to the preset value, the external device is determined as the charger, and when determining that the voltage state value of the analog signal is less than the preset value, the control module determines that the external device is the consumer.

6. The battery pack according to claim 1, wherein the digital signal includes a parameter reading instruction, and when receiving the parameter reading instruction from the communication terminal, the control module sends a working parameter and/or a state parameter of the battery pack to the external device by using the communication terminal.

7. The battery pack according to claim 1, wherein:

the digital signal includes a charging state notification instruction, the battery pack has a low power consumption mode and a normal power consumption mode, the low power consumption mode has a first power consumption, the normal power consumption mode has a second power consumption, and the first power consumption is less than the second power consumption;

and when the control module receives the charging state notification instruction from the communication terminal, the control module controls the battery pack to be switched from the normal power consumption mode to the low power consumption mode.

8. The battery pack according to claim 7, wherein the charging state notification instruction includes fault information of the charger or full charge information of the battery pack and is sent by the charger.

9. The battery pack according to claim 1, wherein:

when the battery pack is connected to the external device, the control module detects at least one working parameter of the battery pack and determines whether the battery pack is in a fault state; and if the battery pack is determined by the control module to be in the fault state, the control module controls to output an abnormality signal by using the communication terminal.

10. The battery pack according to claim 9, wherein:

when the external device is the charger, the control module performs an over-charge determining of the battery pack; if it is determined that the battery pack is in an over-charge state, the control module controls the communication terminal to output the abnormality signal, which is used to be received by the charger and is used as a reference for the charger to control to stop charging; and when the external device is the consumer, the control module performs an over-discharging determining of the battery pack; if it is determined that the battery pack is in an over-discharging state, the control module controls the communication terminal to output the abnormality signal, which is used to be received by the consumer and is used as a reference for the consumer to control to stop discharging.

11. The battery pack according to claim 1, wherein: the battery pack further includes a state indication terminal, and the state indication terminal is connected to the control module and is connectable to the external device;

the control module detects at least one working parameter of the battery pack and determines whether the battery pack is in a fault state;

if the battery pack is determined by the control module to be in a fault state, the control module controls to output an abnormality signal by using the state indication terminal.

12. The battery pack according to claim 11, wherein:

the control module is connected to each battery core and is configured to acquire a single voltage of a battery core, a first voltage and a second voltage are preset in the control module, and the first voltage is greater than the second voltage;

when the external device is the charger, the control module compares the single voltage with the first voltage, if a single voltage of any one of battery cores is greater than the first voltage, it is determined that the battery pack is in an over-charge state, the control module controls the state indication terminal to output the abnormality signal, which is used for the charger to stop charging;

and when the external device is the consumer, the control module compares the single voltage with the second voltage, if the single voltage is less than the second voltage, it is determined that the battery pack is in an over-discharge state, the control module controls the state indication terminal to output the abnormality signal, and which is used for the consumer to stop discharging.

13. The battery pack according to claim 11, wherein:

the control module detects and compares a plurality of single voltages of battery cores to determine a minimum voltage and a maximum voltage, and when a voltage difference between the maximum voltage and the minimum voltage is greater than or equal to a first preset difference, the control module determines the battery pack is in an unbalanced state, and controls to output the abnormality signal by using the state indication terminal.

14. The battery pack according to claim 11, wherein:

the battery pack further includes a switch module, the switch module includes a control end, a first end, and a second end, the control end of the switch module is connected to the control module, the first end of the switch module is connected to the state indication terminal, and the second end of the switch module is grounded; and and the control module controls, by using the control end, the switch module to be opened or closed, when the switch module is opened, the state indication terminal is disconnected from a ground, and the external device detects that the state indication terminal is suspended, so that the state indication terminal outputs the abnormality signal.

15. The battery pack according to claim 11, wherein:

the control module detects a voltage state value at the state indication terminal and compares the voltage state value with a connection recognition preset voltage value which is internally stored in the control module;

when the voltage state value is greater than or equal to the connection recognition preset voltage value, the battery pack is determined to be connected to the external device;

and when the voltage state value is less than the connection recognition preset voltage value, the state indication terminal is determined to be in a fault state, and the control module controls to output the abnormality signal by using the communication terminal.

16. The battery pack according to claim 11, wherein when the control module does not receive a response instruction corresponding to a preset request instruction or does not receive any response in the preset time, the communication terminal is determined to be in a fault state, and the control module controls to output the abnormality signal by using the state indication terminal.

17. The battery pack according to claim 14, wherein:

the battery pack further includes a temperature detection module, configured to detect a temperature of the battery pack, a first end of the temperature detection module is connected to the first end of the switch module, and a second end is connected to the state indication terminal;

and when the switch module is closed, the state indication terminal is grounded by using the temperature detection module, and the external device detects the temperature detection module by using the state indication terminal to obtain the temperature of the battery pack, so that the state indication terminal outputs the temperature of the battery pack.

18. A method for controlling a working status of a battery pack, wherein the battery pack is connectable to an external device for charging or discharging, the external device includes a consumer and a charger, the working status of the battery pack includes a charging state and a discharging state, the battery pack includes a communication terminal, and the battery pack establishes communication with the external device when being connected to the external device, the method comprising:

detecting whether the communication terminal of the battery pack receives a digital signal from the external device;

determining a type of the external device according to the digital signal if the communication terminal of the battery pack receives the digital signal from the external device; and detecting an analog signal of the communication terminal of the battery pack if the communication terminal of the battery pack does not receive the digital signal from the external device, and determining the type of the external device according to the analog signal, wherein:

in response to determining that the external device is the charger, the battery pack is controlled in a charging state; and in response to determining that the external device is the consumer, the battery pack is controlled in a discharging state.

19. A charging system, wherein the charging system includes a charger, and a battery pack according to claim 1.

20. A discharging system, wherein the discharging system includes a consumer, and a battery pack according to claim 1.

* * * * *